United States Patent
Glachet

(10) Patent No.: US 9,227,329 B2
(45) Date of Patent: Jan. 5, 2016

(54) DEVICE FOR THE SEALED ATTACHMENT OF AN INTERCHANGEABLE MEMBER IN A CHAMBER RING MOUNTED ON A WALL OF A CONTAINMENT CELL

(75) Inventor: Charles Glachet, Vendôme (FR)

(73) Assignee: PIERCAN SAS, Paris (FR)

( * ) Notice: Subject to any disclaimer, the term of this patent is extended or adjusted under 35 U.S.C. 154(b) by 1093 days.

(21) Appl. No.: 13/263,137

(22) PCT Filed: Apr. 8, 2010

(86) PCT No.: PCT/EP2010/054655
§ 371 (c)(1),
(2), (4) Date: Oct. 11, 2011

(87) PCT Pub. No.: WO2010/115962
PCT Pub. Date: Oct. 14, 2010

(65) Prior Publication Data
US 2012/0023721 A1 Feb. 2, 2012

(30) Foreign Application Priority Data
Apr. 9, 2009 (FR) .................................... 09 52357

(51) Int. Cl.
*B23Q 3/06* (2006.01)
*B25J 21/02* (2006.01)
(52) U.S. Cl.
CPC ............ *B25J 21/02* (2013.01); *Y10T 29/53978* (2015.10)
(58) Field of Classification Search
CPC .... B23Q 1/0063; B23Q 1/0072; B23Q 1/037; B25B 5/00; B25B 5/061
USPC ...................... 269/309–310, 24, 27, 32, 900; 451/285–288
See application file for complete search history.

(56) References Cited

U.S. PATENT DOCUMENTS

| 4,010,588 A | 3/1977 | Eisert |
| 4,682,766 A * | 7/1987 | Barkley ........................... 269/71 |
| 5,090,782 A | 2/1992 | Glachet et al. |
| 5,662,317 A * | 9/1997 | Beakes et al. ................... 269/58 |
| 6,527,266 B1 * | 3/2003 | Yonezawa et al. ............ 269/309 |
| 7,382,145 B2 * | 6/2008 | Thurmaier ............... 324/756.04 |
| 8,047,520 B2 * | 11/2011 | Kuroda .......................... 269/309 |

(Continued)

FOREIGN PATENT DOCUMENTS

| DE | 66 02 695 U | 3/1969 |
| EP | 0 418 160 A | 3/1991 |

(Continued)

OTHER PUBLICATIONS

International Search Report for PCT/EP2010/054655 dated Jun. 18, 2010.

*Primary Examiner* — Lee D Wilson
(74) *Attorney, Agent, or Firm* — Pearne & Gordon LLP

(57) ABSTRACT

A device for sealed attachment of an oval or circular interchangeable member in an oval or circular chamber ring including a mechanical system for secure immobilization of the interchangeable element through the retaining ring mounted on a wall of a containment cell. The attachment device includes an oval or circular retaining ring supporting the interchangeable member. The integral retaining ring includes at least three recesses and the chamber ring includes at least three bolts able to penetrate into the recesses in order to lock the retaining ring on the chamber ring. The retaining ring receives a set of keys supporting the interchangeable element.

16 Claims, 23 Drawing Sheets

(56) References Cited

U.S. PATENT DOCUMENTS

2006/0055099 A1* 3/2006 Haruna .................. 269/309
2012/0023721 A1* 2/2012 Glachet .................. 29/281.5

FOREIGN PATENT DOCUMENTS

FR  2 248 447 A  5/1975
GB  1 149 495 A  4/1969

* cited by examiner

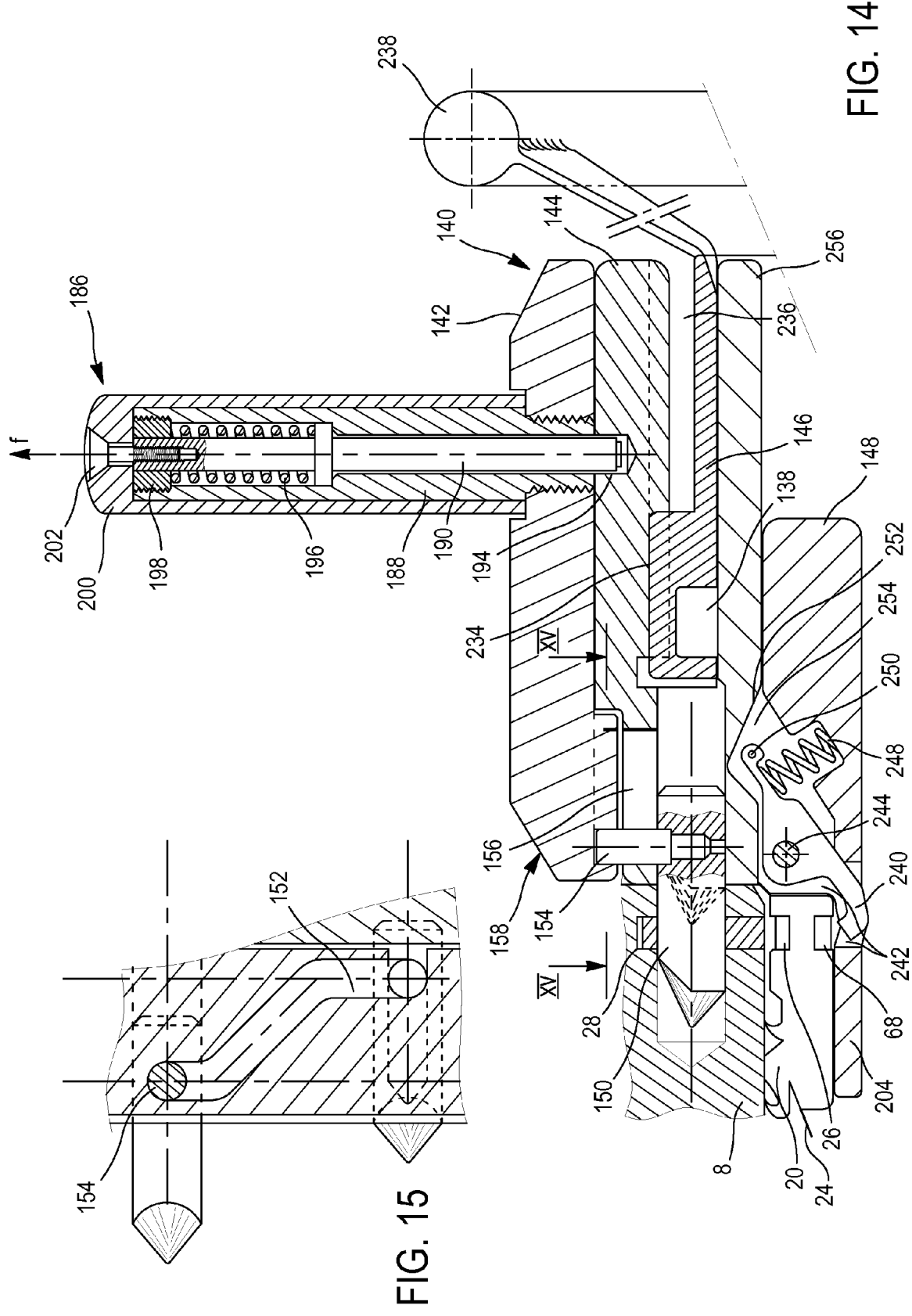

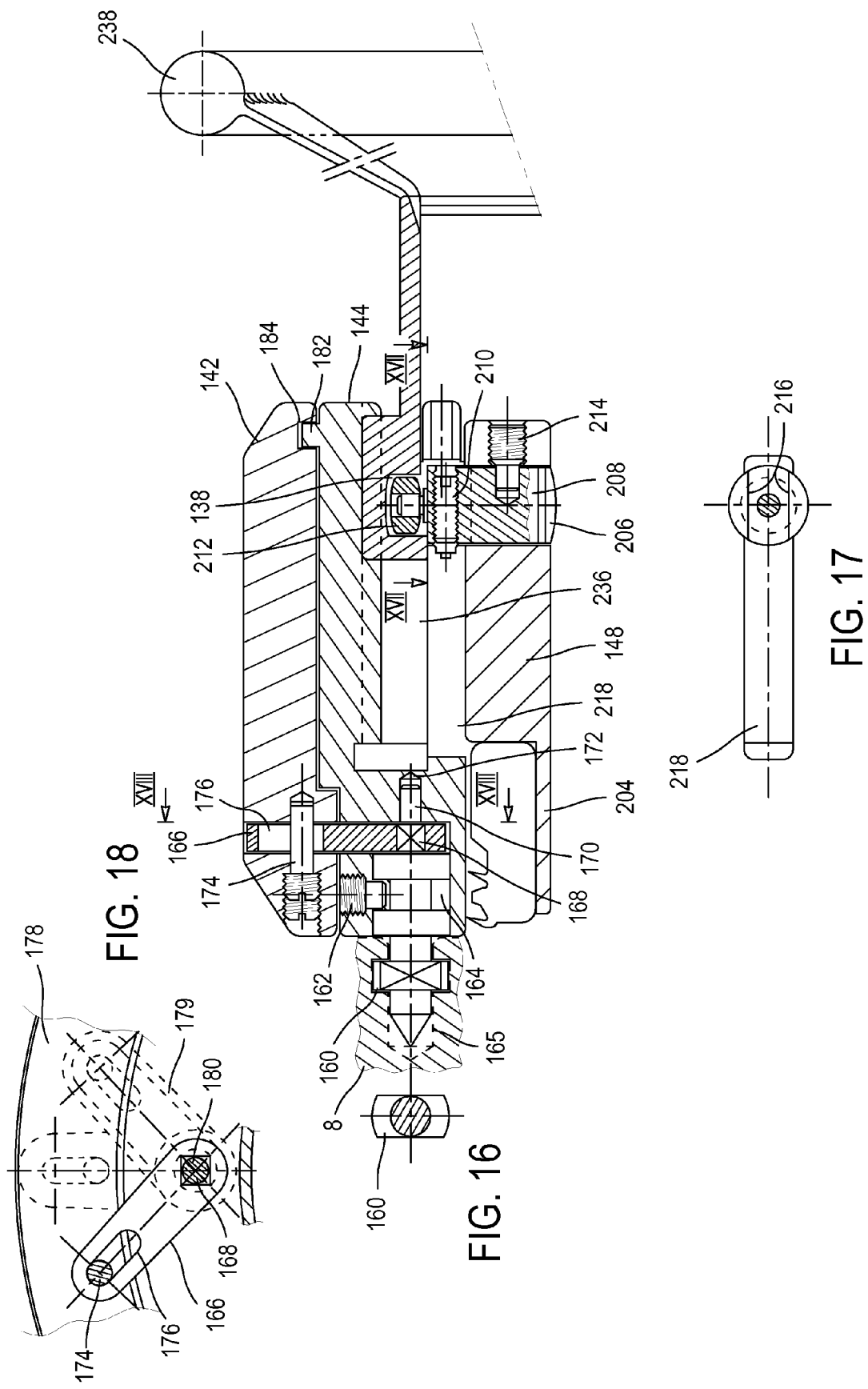

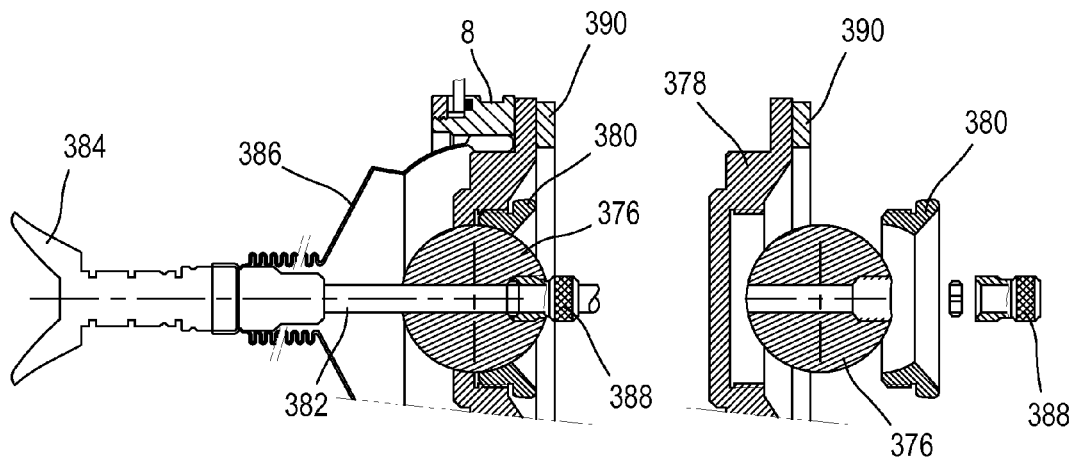
FIG. 22a
FIG. 22b
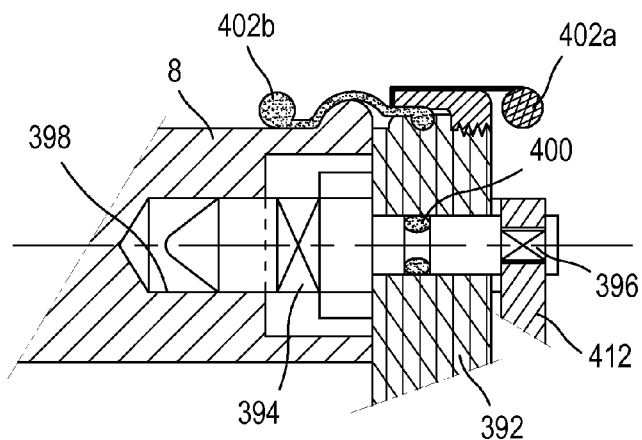
FIG. 22c
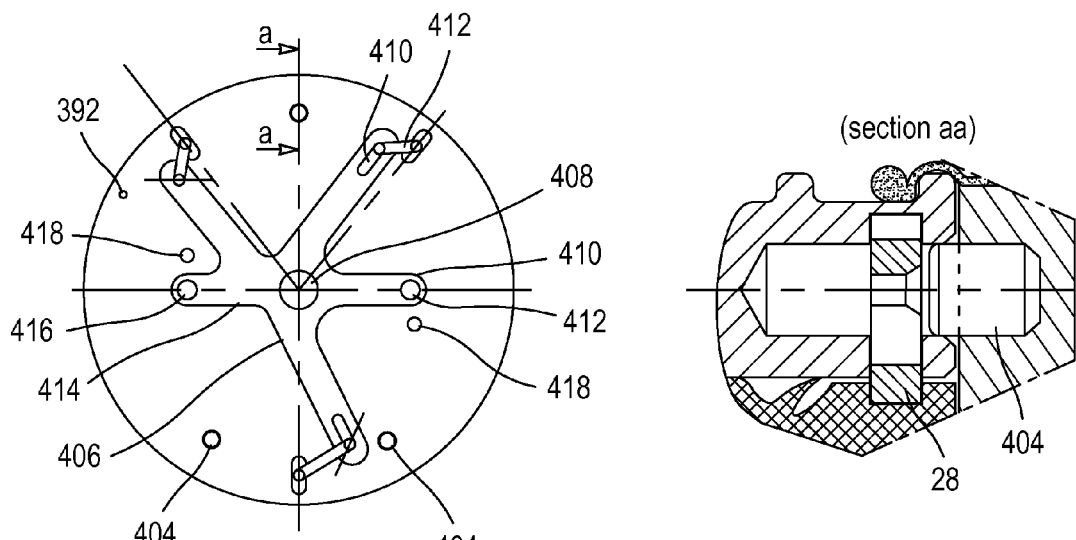
FIG. 22d
FIG. 22e

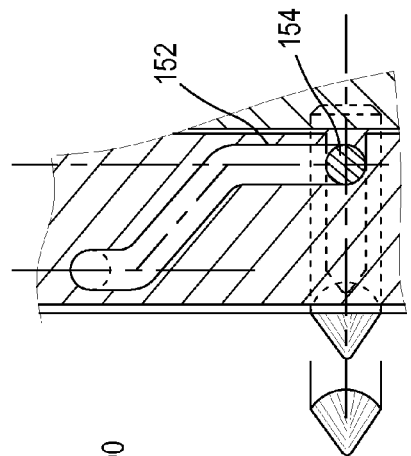
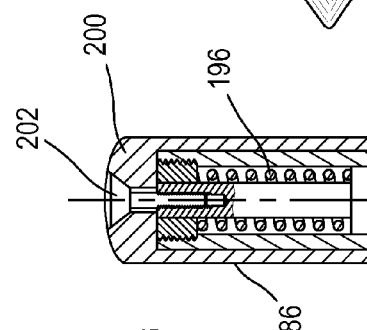
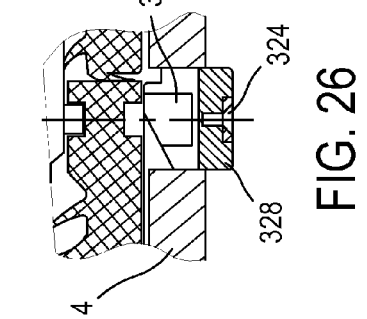
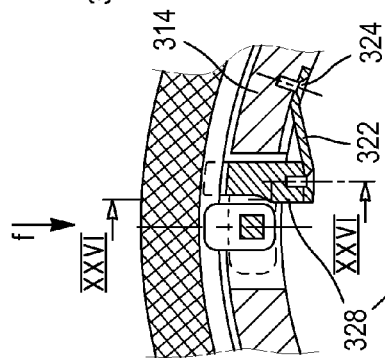
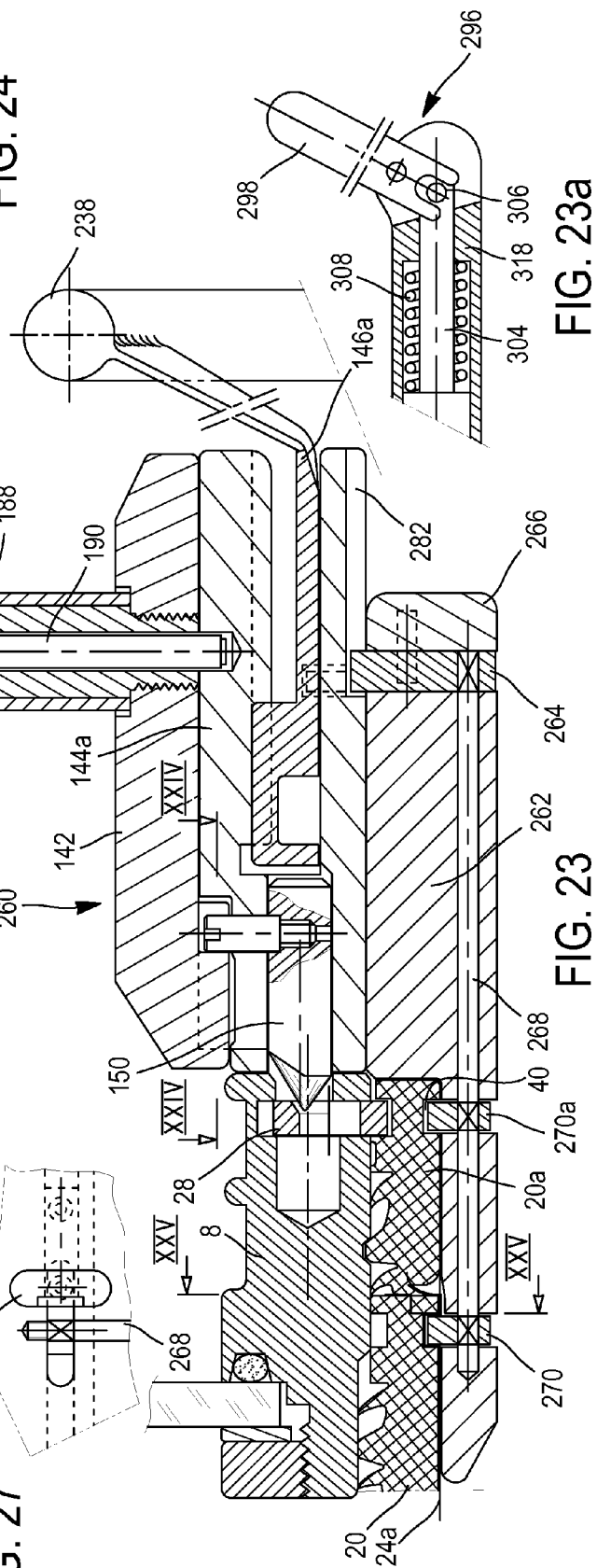

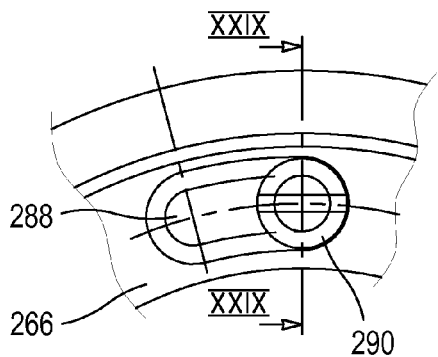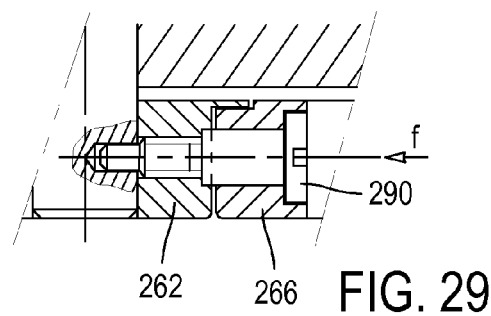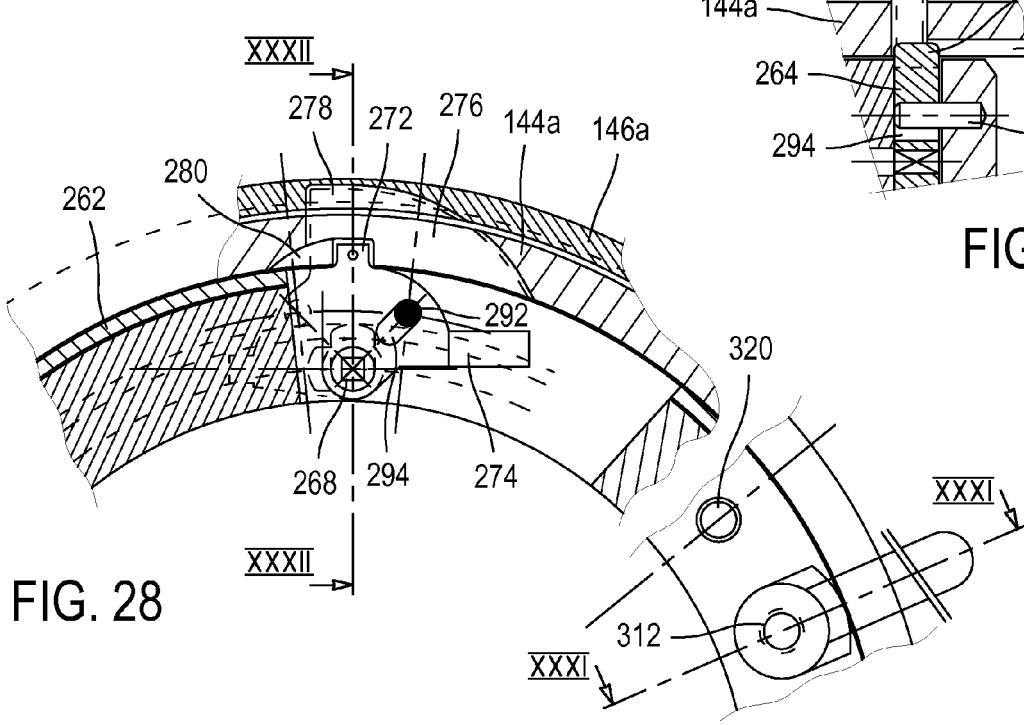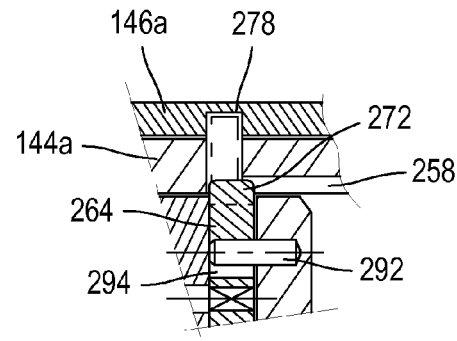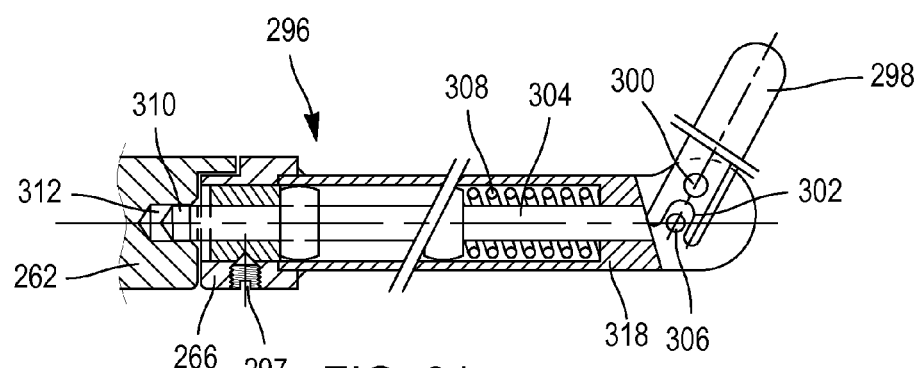

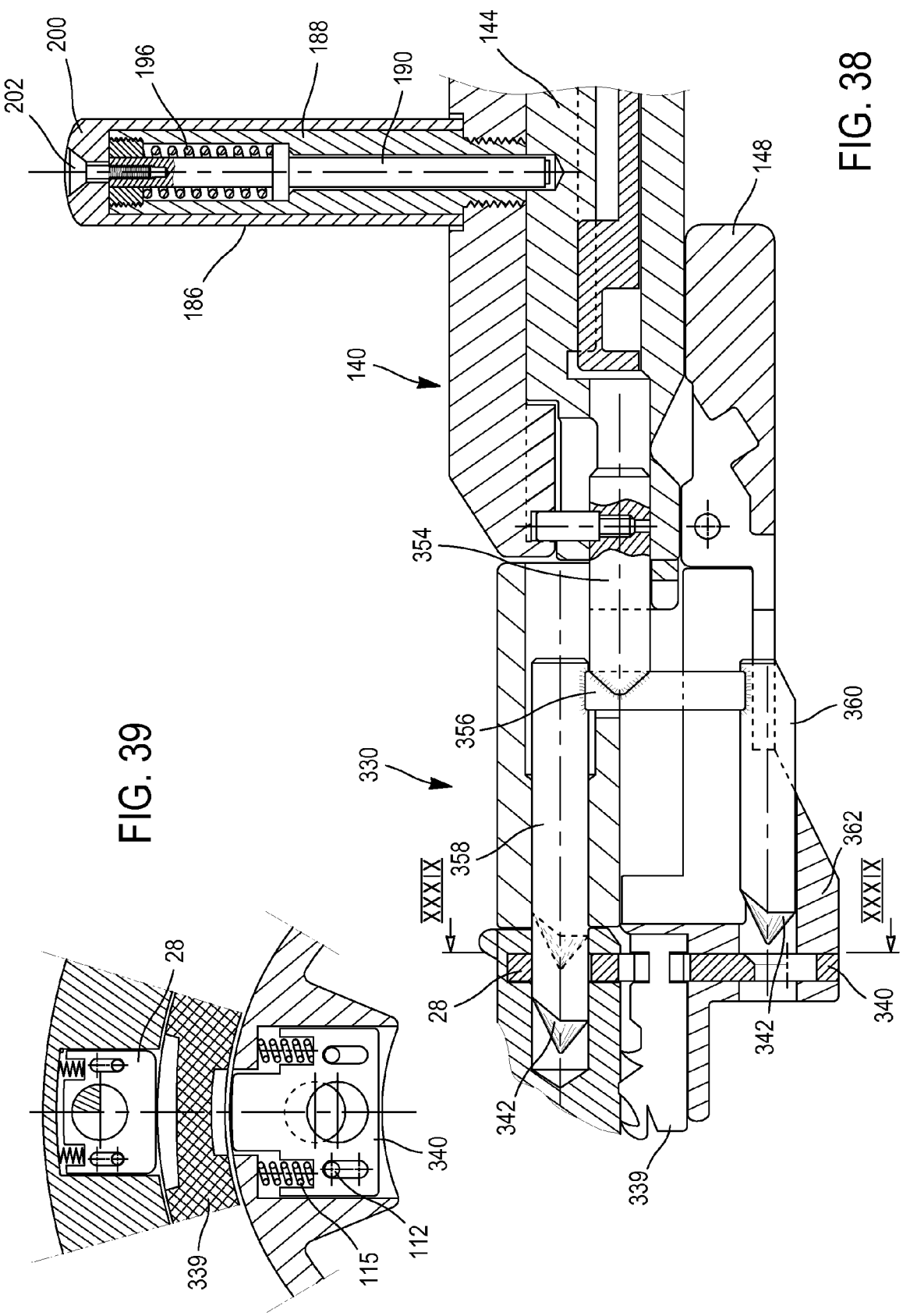

DEVICE FOR THE SEALED ATTACHMENT OF AN INTERCHANGEABLE MEMBER IN A CHAMBER RING MOUNTED ON A WALL OF A CONTAINMENT CELL

FIELD

The invention concerns an oval-shaped or circular-shaped device for sealed attachment of an interchangeable member in a chamber ring mounted on a wall of a containment cell, where this attachment device includes a retaining ring with a double-seal function in relation to the chamber ring supporting the interchangeable member.

More specifically, the invention concerns a device allowing the sealed positioning of an interchangeable element such as a glove, a bag, an observation port, a stopper mounted in sealed fashion on a retaining ring, where this assembly is mounted in its turn in sealed fashion in a cell ring, which is itself attached in sealed fashion on a containment chamber.

BACKGROUND

Document FR 2 652 143 describes a sealed attachment device including a rigid retaining ring capable of being fitted in sealed fashion in the cell ring, so as to put the interchangeable member which is mounted on this retaining ring in position in the cell ring. Accidental stripping off of the retaining ring supporting the interchangeable member is prevented by a safety ring which cooperates both with the retaining ring and with the cell ring by two bayonet connections.

An attachment device designed in this manner has the advantage that the axial effort which must be exerted on the ring supporting the interchangeable member, both to put it in position in the cell ring and to remove it, is very much less than that of an attachment device in which the axial maintenance of the ring supporting the interchangeable member in the cell ring is entirely supported by this ring. The equipment allowing these operations can therefore be relatively simple and controlled manually.

However, such a device has disadvantages.

The safety ring which prevents the rings rotating relative to one another in relation to the chamber ring is of complex design.

Mounting of the retaining ring on the piston of the ejection mechanism requires that the additional ring is disassembled and put back in position.

The system has safety limits if the operator omits to install the safety ring.

It is possible that if, instead of removing the positioning tool by rotating simultaneously the sheath, the sleeve and the piston in one go, the operator pulls back the piston by rotating the control sleeve relative to the sheath, the retaining ring will be extracted out of the cell ring and consequently containment will be breached. There is no safety device preventing such a mistaken operation.

The retaining ring constituted by the assembly of two rigid parts allows only assembly of elements with rolls, such as gloves or bags with a snap ring of precise tolerance, and requires despite this that a compensation joint is attached. A lip seal is required to ensure sealing in relation to the chamber ring. All these elements have a non-negligible influence on the cost of the consumables.

Finally, such a system applies only to circular elements, due to the presence of bayonet locks.

SUMMARY

The purpose of the present invention is, precisely, a device for sealed attachment of an interchangeable member in a chamber ring mounted on a wall of a containment cell which resolves these disadvantages.

This aim is achieved, according to the invention, by the fact that the integral retaining ring includes at least three recesses and by the fact that the chamber ring includes at least three bolts able to penetrate into the recesses in order to lock and prevent rotation of the retaining ring on the chamber ring, and by the fact that it also includes at least three sockets to receive the locking tenons of an ejection gun.

Due to these characteristics it is not possible to have an accidental breach of containment with all its consequences.

The retaining ring preferably includes a cavity in which is received a set of keys on which the interchangeable member is mounted, where the interchangeable member can have rolls or be full-skinned, where the retaining ring includes two lips which provide a double seal in relation to the chamber ring, and a protrusion positioned between the two lips which penetrates into a corresponding groove of the chamber ring, and axially positions the retaining ring relative to the chamber ring.

Due to the presence of two lips which provide sealing in relation to the chamber ring, it is not necessary to have a separate lip seal, as in the prior art, to ensure sealing in relation to the chamber ring. Advantageously, the cavity which receives the key consists of a cylindrical portion including a portion with catches for holding the key, where there is a conical portion opposite the cylindrical portion; the key includes a cylindrical portion which comes into contact with the cylindrical portion of the retaining ring and a conical portion on which the conical portion of the retaining ring exerts a pressure, where catches on the cylindrical portion of the key become attached to the catches of the retaining ring.

Advantageously, key 22, FIG. 3, includes a groove 64 receiving the roll or snap ring of the interchangeable member 24 mounted under tension to ensure sealing with key 22, where this groove 64 is followed by a lip 51 which provides a first seal on the conical portion 50 of key 22, followed by a second lip 62 to provide a second seal on the cylindrical portion 44 of key 22.

Advantageously, also, retaining ring 20, FIG. 7, includes a protrusion 90 located at one end of the retaining ring, where this protrusion 90 is followed by two sealing lips 30, 32, which produce a double seal between the retaining ring and the chamber ring.

Advantageously also, the conical portion of the key includes a sealing lip which is either pressed on the conical portion, or on the cylindrical portion upstream from the conical portion of the cavity of the retaining ring in order to produce a first seal between the key and the retaining ring, where the cylindrical portion of the key includes a sealing lip which rests on the cylindrical portion of the cavity of the retaining ring in order to produce a second seal between the key and the retaining ring.

A complete seal is thus produced between the key and the retaining ring. The device including a key intended to fasten an interchangeable member with a roll and to fasten without a roll is preferably characterised in that the key includes a jaw pointing towards the interior of the cavity of the retaining ring, where this jaw is able to pinch an end skin of the interchangeable member, where the key includes a flap enabling a flexible interchangeable member to be assembled directly by welding.

Due to this characteristic the key is able to receive both an interchangeable member with a roll and an interchangeable member without a roll, operating regardless of the tolerance of the roll. This leads to an economy in the manufacture of the interchangeable member.

This principle of a key may be used for attaching a recoverable bag on container heads.

It is also possible to envisage replacing the keys by an injection of a polymerisation agent (an advantageous solution for very large quantities of a single product).

In addition, the invention concerns an ejection gun for a fastening device able to move a retaining ring towards the interior of a containment cell, and to replace it by a new retaining ring, where the ejection gun consists of a locking control sheath, a nut body, where the control sheath is mounted rotating on the nut body, an ejection piston and a piston control screw, where the ejection piston is mounted sliding in the nut body.

Advantageously, the ejection gun includes at least three tenons mounted rotating in the nut body, where these tenons are locked by being rotated in corresponding mortises in the chamber ring, where the tenon includes a square on to which is screwed a connecting rod in which a slot is formed, and where a threaded spindle screwed in the control sheath traverses the slot such that it rotates the connecting rod by a rotation of the sheath.

Also advantageously, the ejection gun includes at least three retractable slugs which cover bolts of the chamber ring which lock the retaining ring on to the chamber ring, where the retractable slugs are able to cause the bolts to emerge from the recesses of the retaining ring, where these retractable slugs are coupled with driving pins which slide in cam profiles machined inside the control sheath.

A foolproofing system is preferably attached on to the locking control sheath, where the foolproofing system includes a catch which becomes engaged in a groove formed in the extraction piston, where the groove is terminated by a lengthways slot perpendicular to the groove.

Lastly, the invention concerns an extraction gun for a fastening device able to extract a retaining ring from the interior towards the exterior of a containment cell, and to replace it by a new ring, where the extraction gun consists of a locking control sheath, a nut body, where the control sheath is mounted rotating on the nut body, an extraction piston sliding in the nut body and a piston control screw, where the extraction piston includes a tongue able to receive two retaining rings.

The extraction gun also advantageously includes a retractable pin, where this retractable pin includes a driving pin which moves inside a cam profile in such a way that it moves the retractable pin between an "in" position and an "out" position, where the extraction piston also supports a control ring which causes a bolt cam to rotate, where the said cam is rotationally coupled with a shaft which supports a first and second cleat, and where these cleats are able to penetrate by rotation into grooves made in a first and second retaining ring mounted on the tongue of the extraction piston.

Advantageously, the extraction gun includes two control handles allowing rotation of a ring driving a bolt cam, where each control handle includes an index rod terminated by an index which penetrates into an index hole in the extraction piston, and where the index rod being biased in its position of penetration in the index hole by a spring which rests on a shoulder of the index rod.

Also advantageously, a foolproofing system is attached to the control sheath, where the foolproofing system includes a catch which can be engaged in a lengthways slot formed in the extraction piston, where the lengthways slot is terminated at each end by a groove perpendicular to the lengthways slot.

In a particular embodiment the device according to the present invention includes a chamber ring and a retaining ring of oval section, where the device includes an ejection gun coupled to an additional module, where this additional module includes in a vertical plane of the device a first assembly of two retractable pins and, in two symmetrical positions relative to the vertical plane, two second assemblies of retractable pins, where the first assembly and the two second assemblies of retractable pins permit, when the piston returns, the retaining ring to be secured temporarily on its piston.

BRIEF DESCRIPTION OF THE DRAWINGS

Other characteristics and advantages of the present invention will be seen on reading the following description of an example embodiment, given as an illustration with a reference to the appended figures. In these figures:

FIG. 14 is a lengthways section view of the ejection gun enabling the retaining ring to be put in position and the immobilisation bolts to be controlled;

FIG. 15 is a rectified diagram section view along line XV, XV of FIG. 14;

FIG. 16 is another lengthways section view of the ejection gun showing the locking mechanism, with the piston in the rear position:

FIG. 17 is a section view along line XVII, XVII of FIG. 16;

FIG. 18 is a section view along line XVIII, XVIII of FIG. 16;

FIGS. 22a and 22b represent the adaptation of a ball-and-socket joint on a chamber ring;

FIGS. 22c, 22d and 22e represent the adaptation of a safety plug on a chamber ring;

FIG. 23 is a lengthways section view which represents the extraction gun of the interchangeable elements intended specifically for over-pressure, sterile chambers;

FIG. 23a is a detail view showing a handle assembly;

FIG. 24 is a rectified diagram section view along line XXIV, XXIV of FIG. 23;

FIG. 25 is a section view along line XXV, XXV of FIG. 23;

FIG. 26 is a section view along line XXVI, XXVI of FIG. 25;

FIG. 27 is a view along arrow f of FIG. 25;

FIG. 28 represents the control for handling the retaining rings and the various safeties;

FIG. 29 represents a section view along line XXIX, XXIX of FIG. 30;

FIG. 30 represents a view along arrow f of FIG. 29;

FIG. 31 represents a section view along line XXXI, XXXI of FIG. 28;

FIG. 32 represents a section view along line XXXII, XXXII of FIG. 28;

FIG. 38 is a section view along line XXXVIII, XXXVIII of FIG. 46;

FIG. 39 is a section view along line XXXIX, XXXIX of FIGS. 37 and 38;

DESCRIPTION

Figure 1:
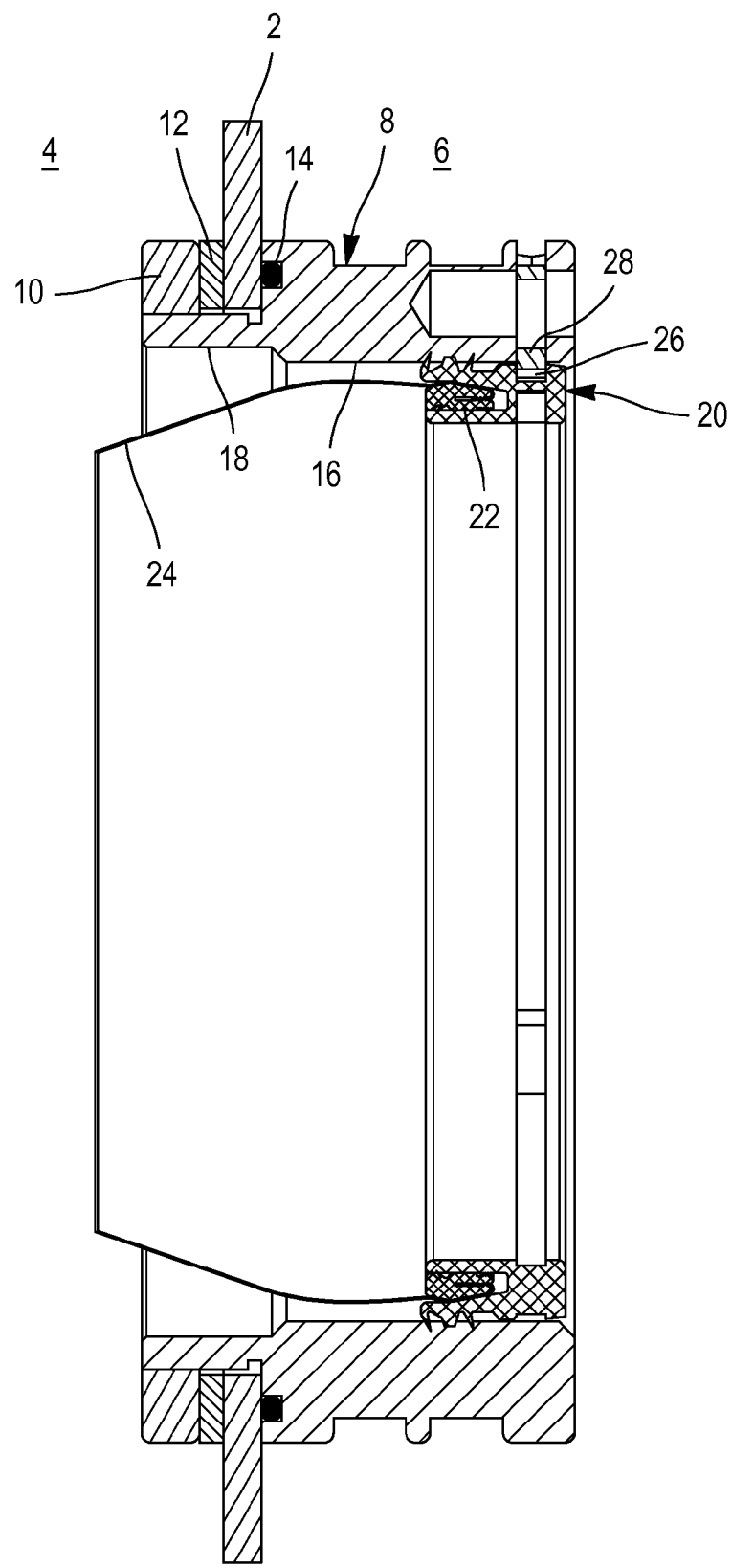
FIG. 1 is a section view of a sealed chamber wall fitted with a sealed attachment device in accordance with the present invention.

In FIG. 1, reference 2 designates a small portion of the wall of a sealed containment chamber used to isolate an internal volume 4 relative to the external atmosphere 6. The internal volume 4 is normally at low pressure relative to the external atmosphere 6 when the cell contains dangerous products or a dangerous atmosphere, as is normally the case in the nuclear field. The internal volume 4 is, conversely, at high pressure relative to the external atmosphere 6 when the volume 4 must be protected from external contamination, as is the case notably in the pharmaceutical field.

The portion of wall 2 illustrated in FIG. 1 includes a circular passage in which a cell ring 8 is attached in sealed fashion. In the example, chamber ring 8 includes a shoulder held pressing against the outer face of wall 2 by a nut 10 screwed on to a thread formed on a tubular portion of chamber ring 8 traversing wall 2. Nut 10 is pressed against the inner face of wall 2 through a bearing washer 12. The seal between wall 2 and chamber ring 8 is provided by an O-ring 14 mounted on an annular groove formed in the shoulder of chamber ring 8 pressed against the outer face of wall 2.

This chamber ring may come in a variety of different models, depending on its use, which has no influence on its function.

Chamber ring 8 includes a bore 16 followed, in the direction from outside to inside of the chamber, by a bore 18 of greater diameter. A retaining ring 20 is introduced into bore 16. Retaining ring 20 contains a key 22 which holds an end of an interchangeable member 24 such as a glove, a collar or a bag. Retaining ring 20 includes at least three recesses 26. The chamber ring includes at least three bolts 28 able to penetrate into recesses 26 in order to lock the retaining ring on the chamber ring.

Figure 2:
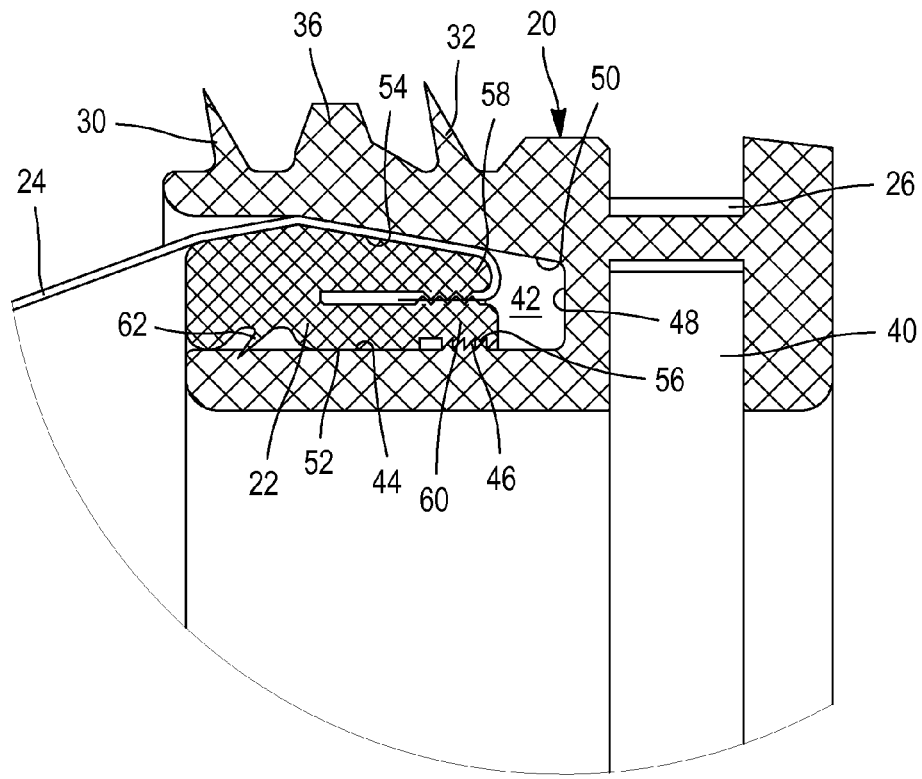
FIG. 2 is a section view at an enlarged scale of a portion of a retaining ring including a key for an interchangeable member without a roll.

In FIG. 2, reference 20 designates an integral retaining ring. It includes a seal portion consisting of two lips 30 and 32 which provide a seal at two places. Lips 30 and 32 constitute an active seal portion in relation to the area referenced 34 of the chamber ring of FIG. 8. An annular protrusion of trapezoid section 36 is positioned between the two lips 30 and 32. This protrusion axially positions the retaining ring relative to a housing 38 (FIG. 8) of chamber ring 8. Three recesses 26 enable bolts 28 of chamber ring 8 to be received.

In the example represented in FIG. 2, retaining ring 20 is intended for a high-pressure chamber. Indeed, lips 30 and 32 are inclined towards the inside of the chamber, i.e. leftwards according to the figure.

A groove 40 enables hooks to be received which will be described in greater detail below.

There is a cavity 42 to receive the various types of key in accordance with the invention. Cavity 42 includes a cylindrical portion 44 supporting the key. Cylindrical portion 44 includes a notched portion 46. It is terminated by a base 48. Opposite cylindrical portion 44 is a conical portion 50 which compresses key 22. Key 22 includes a cylindrical portion 52 which comes into contact with cylindrical portion 44 of retaining ring 20 and a conical portion 54 on which the conical portion of the retaining ring exerts pressure. Catches 56 on the cylindrical portion of the key become attached to the catches of the retaining ring and hold the key in cavity 42.

The key includes two jaws 58 and 60. These two jaws can be separated to allow an end of interchangeable organ 24 to pass between them. Jaws 58 and 60 include teeth in their internal portion. These teeth hold by gripping the end of the interchangeable member. This interchangeable member 24 passes over conical portion 54 of the key. It is trapped between the conical portion of the key and conical portion 50 of retaining ring 20, thus producing a first seal. A second seal is produced between key 22 and cylindrical portion 44 of retaining ring 20 by a lip 62 of the key.

Figure 3:
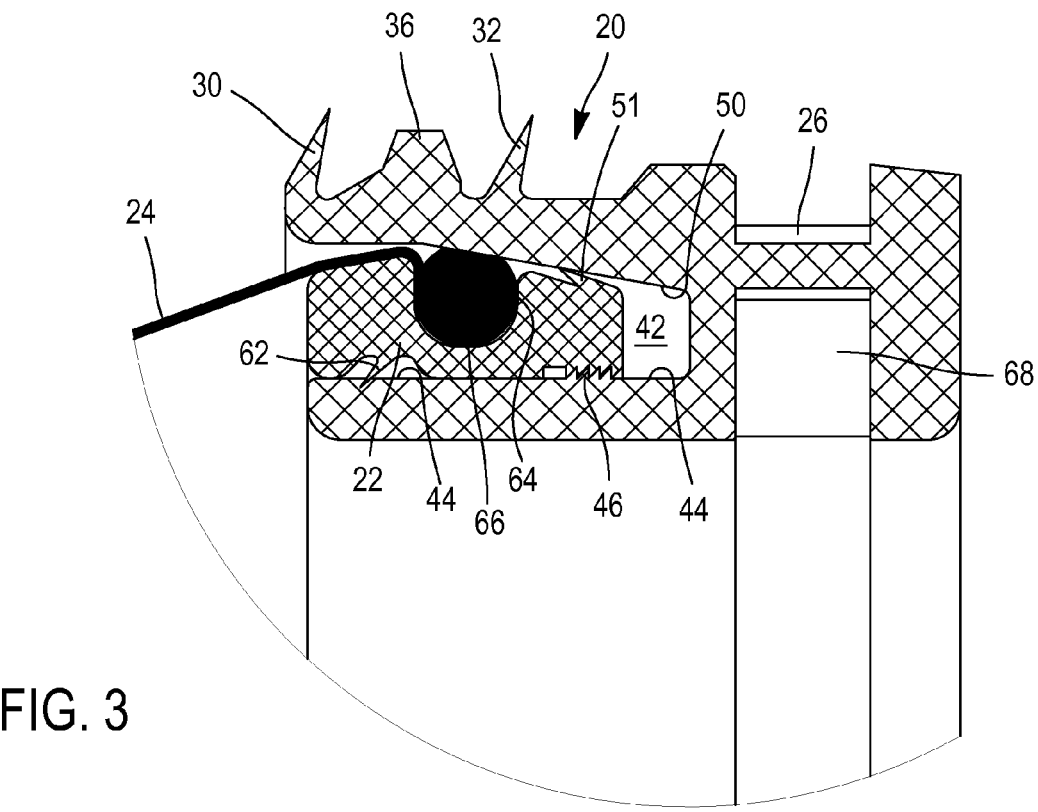
FIG. 3 is a view at an enlarged scale of a portion of a retaining ring including a key for an interchangeable member fitted with a roll.

In FIG. 3 a variant embodiment of the retaining ring represented in FIG. 2 has been represented. This retaining ring is distinguished in that it is intended for a low-pressure chamber, as is shown by lips 30 and 32, which are pointing towards the exterior of the chamber, i.e. towards the right in FIG. 3. Cavity 42 contains a different key 22. Key 22 includes a circular groove 64 intended to receive a snap ring or a roll not subject to stress with conical portion 50 for an interchangeable member 24, such as a glove or a bag, the roll or snap ring of which only provides the seal in the hollow portion of the groove by their being assembled as extensions; the manufacturing tolerance of the rolls' diameters is not of prime importance. Conical portion 50 of retaining ring 20 exerts the compression of first lip 51 of key 22 on conical portion 50 of the retaining ring. By this means a first seal is obtained between retaining ring 20 and key 22. A second seal is produced, as in the example described with reference to FIG. 2, by lip 62 which is applied on to cylindrical portion 44 of retaining ring 20.

Lastly, another difference between the retaining rings of FIGS. 2 and 3 lies in the fact that, according to FIG. 3, retaining ring 20 includes three recesses 68 located in the same axis as recesses 26. The three recesses 68 replace groove 40 of the retaining ring of FIG. 2. They enable hooks to be received, as will be explained in greater detail below.

Figure 3A:
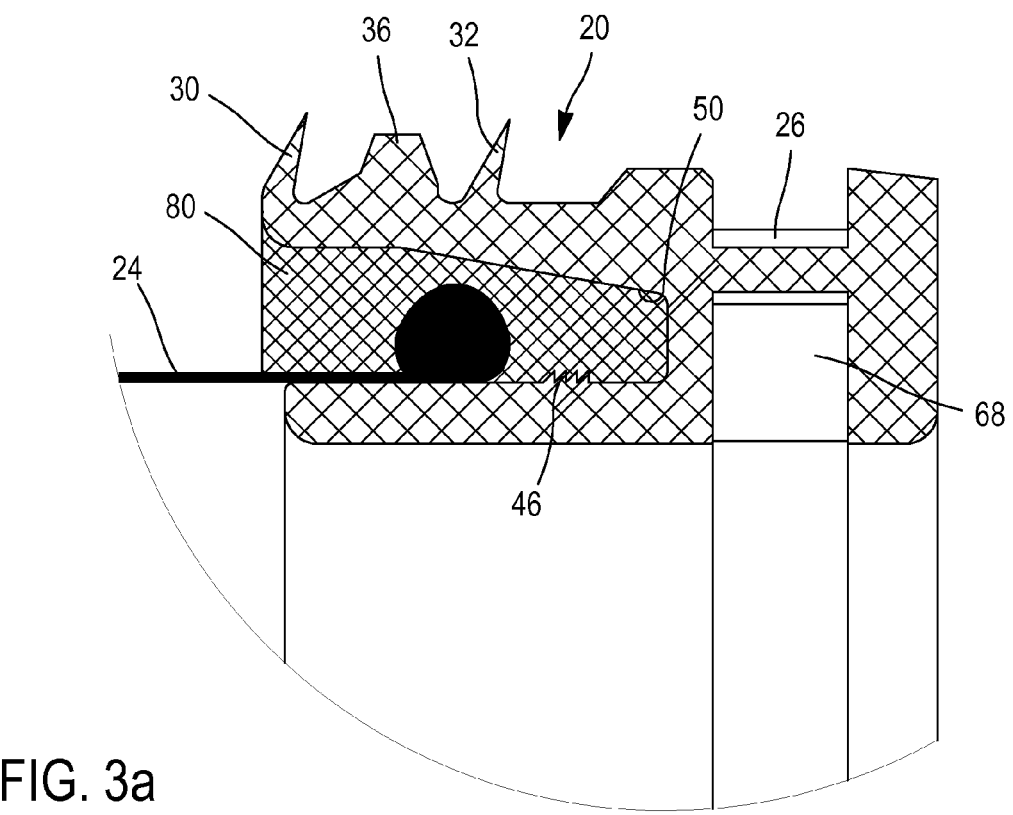
FIG. 3a is a view at an enlarged scale of a variant replacing the key by an injection of a polymerisation agent.

In FIG. 3*a* a variant embodiment has been represented, consisting in replacing the key by a polymerisation agent injected after mounting of the interchangeable member with a roll. This polymerisation agent 80 will be incorporated in the inner walls of cavity 42, and interchangeable element 24 provides both the mechanical holding and the seal. This principle advantageously applies to large production runs, in order to reduce their cost.

Figure 4:
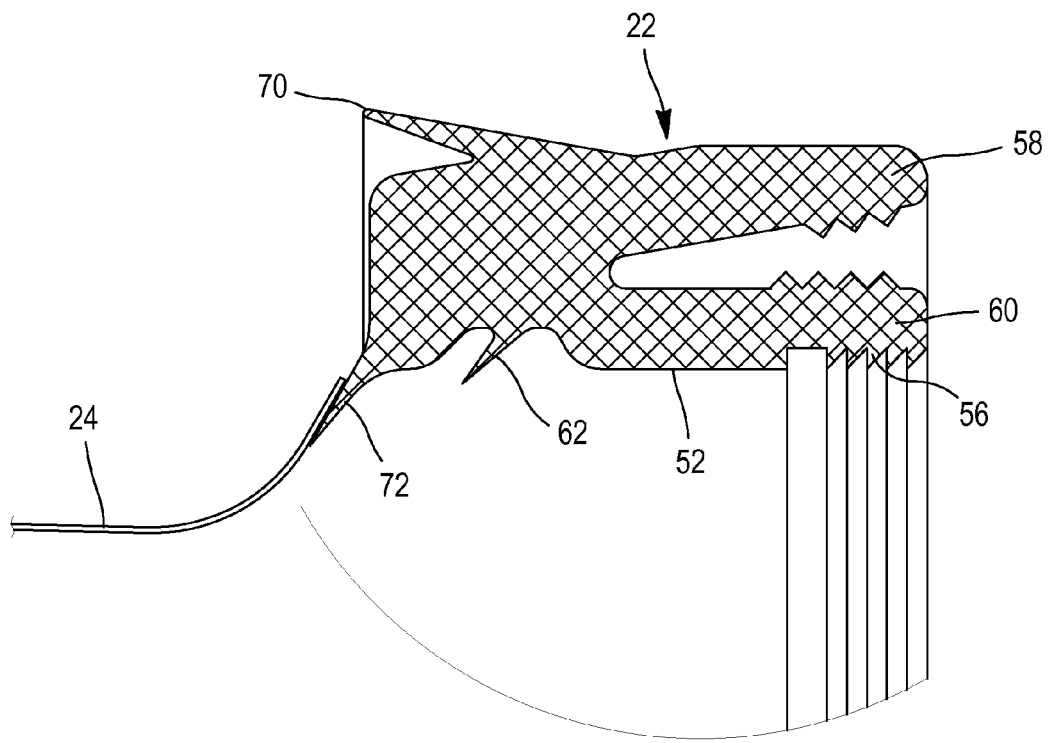
FIG. 4 is a section view at an enlarged scale of a key including a flap enabling a flexible interchangeable member to be assembled directly by welding.

In FIG. 4 a section view at an enlarged scale of a portion of a key 22 of a third type has been represented. Like the key represented in FIG. 2, key 22 includes two jaws 58 and 60, represented here in position, spaced from one another, bearing in mind that conical portion 50 of retaining ring 20 does not bring them close to one another. In the same manner, key 22 includes catches 56 intended to attach to catches 46 of the retaining ring. The key represented in FIG. 4 is distinguished by the presence of a lip 70 constituting a first seal with the cylindrical portion upstream from conical portion 50 of the retaining ring. As in the embodiment of FIGS. 2 and 3, a lip 62 provides a second seal with cylindrical portion 44 of retaining ring 20. Lastly, key 22 of FIG. 4 is distinguished by the presence of a flap 72 enabling a flexible interchangeable member such as member 24 to be assembled directly by welding.

Figure 5:
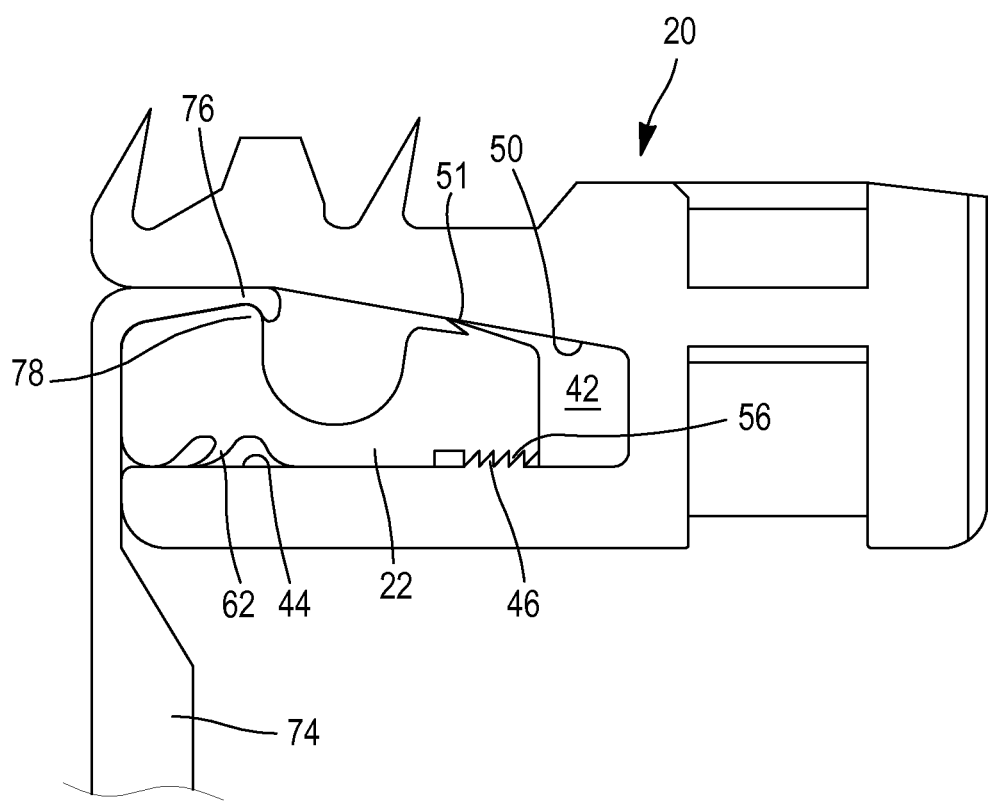
FIG. 5 is a section view at an enlarged scale of a retaining ring including a key of FIG. 3 for receiving a stopper assembled by an adhesion agent.

In FIG. 5 a variant embodiment of a key 22 in accordance with the present invention has been represented. This key is intended to support a stopper 74. This stopper includes a clip 76 which is clipped on to a rounded portion 78 of key 22. The first seal is produced by the first lip of the key on conical portion 50 of the retaining ring. A second seal is obtained by lip 62 which comes into contact with cylindrical portion 44 of retaining ring 20. An additional seal is provided by the use of an adhesion agent between stopper 74 and the conical portion of retaining ring 20, firstly, and between stopper 74 and rounded portion 78 of key 22, secondly. This adhesion agent may, for example, be Loctite 10/30® glue providing a mechanical connection and the seal between the two elements.

Figure 6:
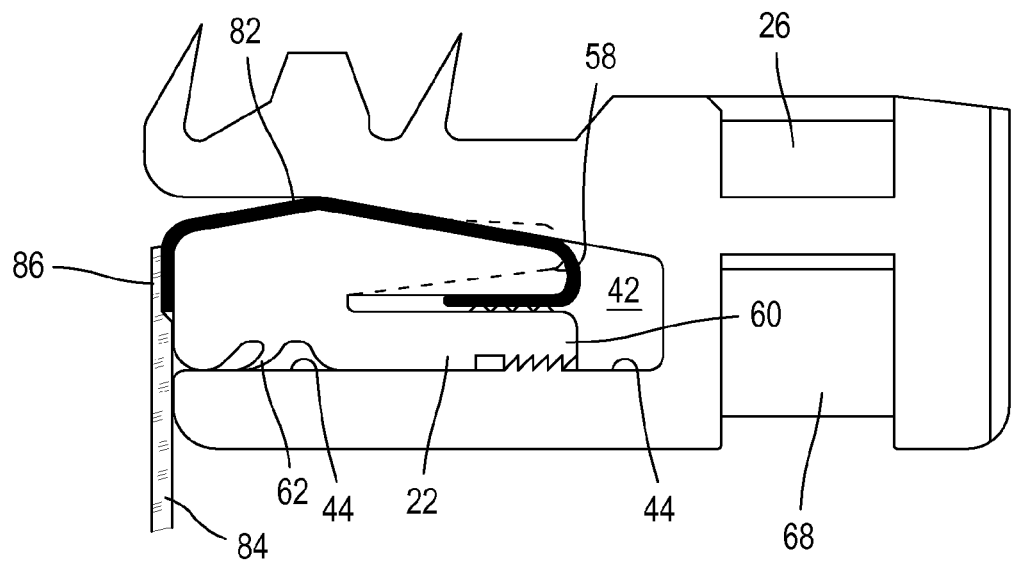
FIG. 6 is a section view at an enlarged scale of a retaining ring including a key of FIG. 2 receiving an observation port.

In FIG. 6 the assembly of an observation port using a key 22 in accordance with the present invention has been represented. This key is similar in all details to the one which has been described with reference to FIG. 2. It includes two jaws 58 and 60. Jaws 58 and 60 are tightened one against the other due to conical portion 50 of retaining ring 20. They tighten a wall of a flexible observation port 82 between them. This wall passes over the conical portion of the key before being connected with observation port 84 by a weld 86. Observation port 84 is manufactured, for example, from pressed PVC crystal.

Figure 7:
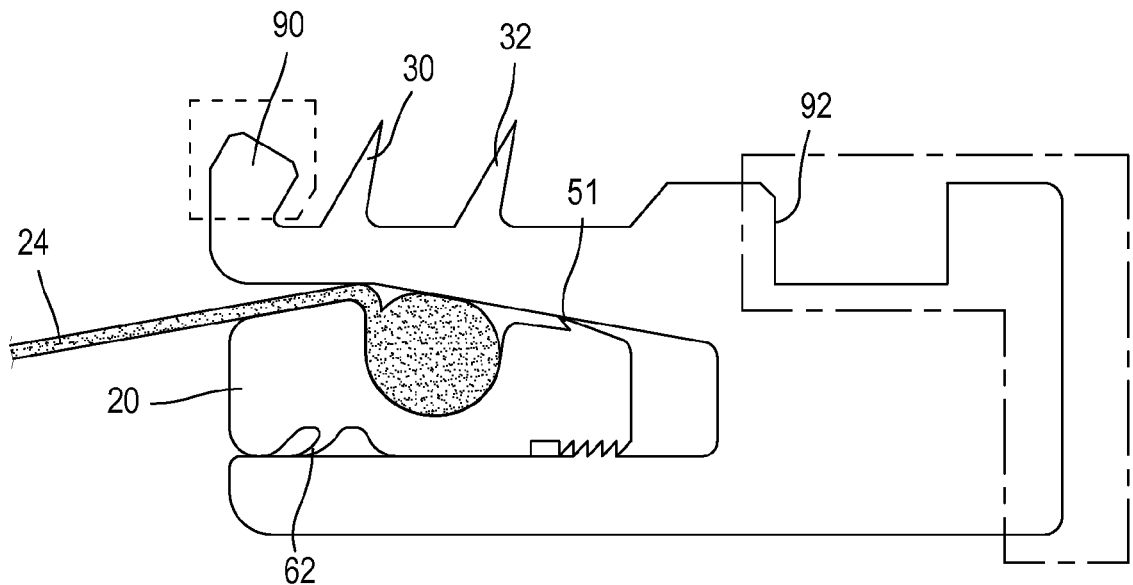
FIG. 7 is a section view of a retaining ring intended to be adapted to a sealed attachment device of the prior art.

In FIG. 7 a section view at an enlarged scale of a retaining ring adapted to the prior art described in patent FR 2 652 143 has been represented. This retaining ring includes two lips 30 and 32. However, trapezoid protrusion 90, instead of being positioned between the two lips 30 and 32, is positioned in front of these two lips. Secondly, instead of including recesses such as recesses 26 of the invention, the retaining ring adapted to the existing system includes a circular groove 92 with lugs adapted to the prior art and a recess. Operation of this retaining ring is identical to the operation of the retaining rings described above.

Figure 8:
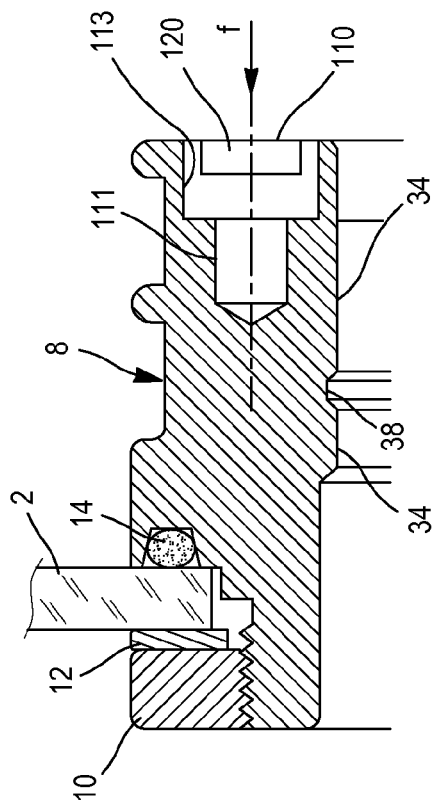
FIG. 8 is a section view of a chamber ring mounted on the wall of the containment chamber with its mechanism for immobilising the retaining ring.

In FIG. 8 a section view at an enlarged scale of a portion of chamber ring 8 has been represented. In this figure, reference 2 designates a small portion of the wall of a sealed chamber used to isolate an internal volume 4 relative to the external atmosphere 6.

It should be noted that, if it is necessary to protect a product contained in the chamber in relation to an external atmosphere, rigorous use requires that the interchangeable elements are replaced from the inside of the chamber to the outside. Alternatively, it is necessary to remove the products beforehand before changing the glove or bag, etc. And then to return the chamber to conditions acceptable for the manufacture of the said products (cleaning, sterilisation, etc.). The present invention allows such rigour, through the use of retaining ring 20 of FIG. 2 with the extraction gun, which will be described in greater detail below.

There are two rolls 94 for the positioning of a glove-holding diaphragm in the case of a high-pressure chamber or a sealed safety plug for a low-pressure chamber. An input chamfer 96 enables the lips of the retaining rings to be held back without damaging them. Another essential accessory in the nuclear field is a ball-and-socket joint which can be fitted to chamber ring 8. It enables a remote manipulator arm to be received for handling in a low-activity glove box the contact radiation of which prevents the use of gloves. As was explained above, an active cylindrical portion 34 makes contact with the lips of the retaining ring, thus producing a double seal. An annular groove 38 receives protrusion 36 (see FIG. 2) and thus positions the retaining ring axially relative to the chamber ring, maintaining it with a force greater than the action of the low pressure or high pressure. A chamfer 98 releases the lips, in the case of a low-pressure chamber, or acts as the entrance for the lips in the case of a high-pressure chamber. A cylindrical portion 100 of diameter greater than the external diameter of the retaining rings thus prevents it being held after being ejected. This cylindrical portion is followed by a rounded element 102. This configuration provides the possibility of mounting accessories such as a containment plug or a glove-holding crosspiece.

As was previously explained, an O-ring 14 provides the seal between wall 2 and chamber ring 8 by the pressure of pressure screws 104 on distribution washer 12. The reaction is provided by nut 10 screwed on to ring 8. Nut 10 and distribution washer 12 can thus be made in two portions in order to allow the existing equipment to be replaced without disassembling panels, where the nut and the washer pass through the existing hole of the chamber ring. Three blind holes 106 made in chamber ring 8 act as a guide for the retractable pins of the ejection gun which will be described in greater detail below. Bolt 28 slides in bolt housing 108.

In FIG. 8, reference 105 designates a vertical marker line intended to facilitate presentation of the ejection gun.

Figure 9:
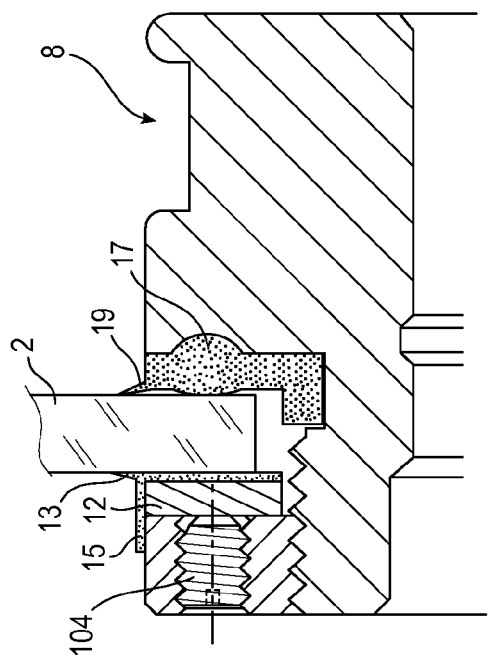
FIG. 9 is a section view of the chamber ring represented in FIG. 8 according to another section plane.

In FIG. 9 a section view at an enlarged scale of the chamber ring passing through a plane different to the plane of FIG. 8 has been represented. Three locking sockets 110 allow the tenons of the ejection gun to be received. A hole 111 for centring the tenons followed by a bore 113 allow the tenon to rotate from its vertical position to a horizontal position, i.e. a rotation of 90°. Mortise 120 allows the tenon of the ejection gun to penetrate.

Figure 10B:
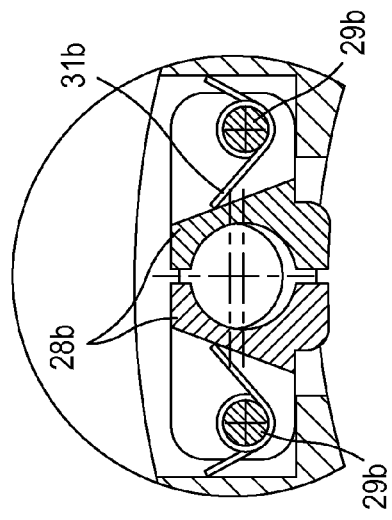
FIGS. 10a and 10b illustrate two variant embodiments of a bolt.
Figure 10:
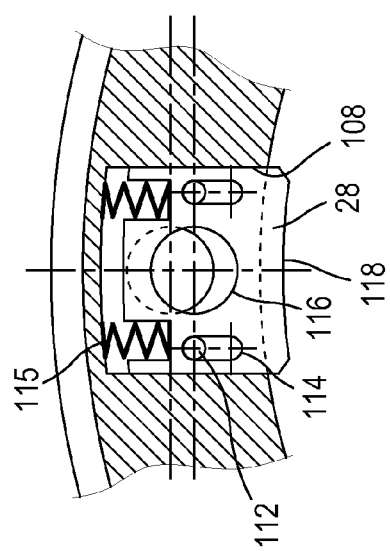
FIG. 10 is a section view along line X, X of FIG. 8.

In FIG. 10 a section view along line X, X of FIG. 8 has been represented. In FIG. 10 two bolt springs 115 exert a force on bolt 28 in the "out" position. Bolt stops 112 which slide in bolt stop slots 114 limit the movement of the bolt. The bolt's control hole 116 has a diameter matching the retractable pin of the ejection gun. The positioning of the two springs either side of the bolt shaft prevents this bolt from getting caught. The internal shape 118 of the bolt matches the base of recesses 26 of the retaining ring. Indeed, it has the same diameter.

Figure 10A:
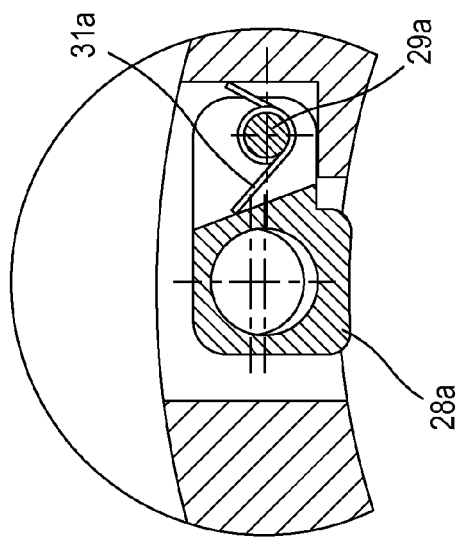

In FIGS. 10a and 10b two variant embodiments of the sliding bolt represented in FIG. 10 have been represented. In both these variants, bolts 28a and 28b are assembled pivoting instead of being sliding. Bolt 28a is integral. It is assembled pivoting around a shaft 29a and it is brought back to its "out" position by a return spring 31a. Bolt 28b is made from two half-bolts. Each of these half-bolts is assembled pivoting around a shaft 29b. They are returned to their "out" position by two return springs 31b. The embodiments of FIGS. 10a and 10b apply particularly to chamber rings of small diameter, which are more difficult to machine.

Figure 11:
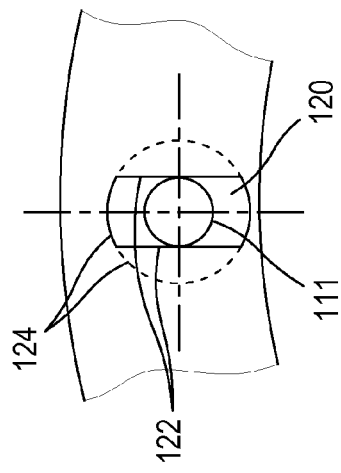
FIG. 11 is a side view of the retaining ring represented in FIG. 9 along arrow f.

In FIG. 11 a view along arrow f of FIG. 9 has been represented. Mortise 120 consisting of its two sides 122 joined by a circle arc of the same diameter 124 allows the tenons of the ejection gun to penetrate.

The angular positions of mortises 120 allow only a single locking position of the ejection gun. Indeed, relative to the vertical socket the other two form an angle of 100°.

Figure 8B:
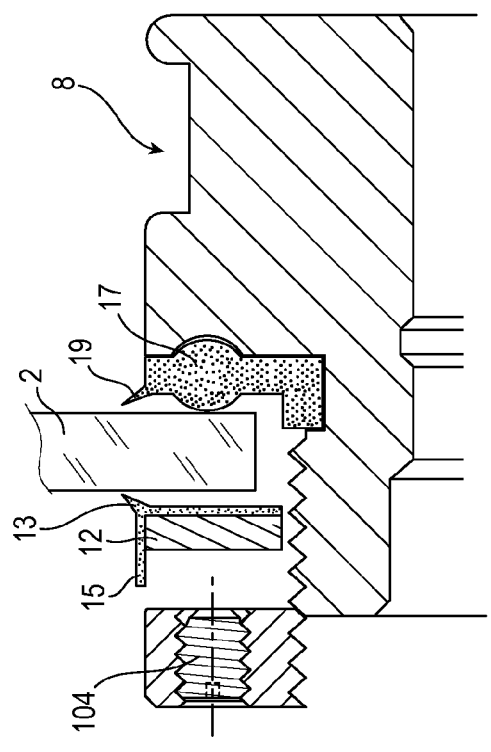
FIGS. 8a and 8b are section views which illustrate a chamber ring which is specially adapted for assembly on glass.
Figure 8A:
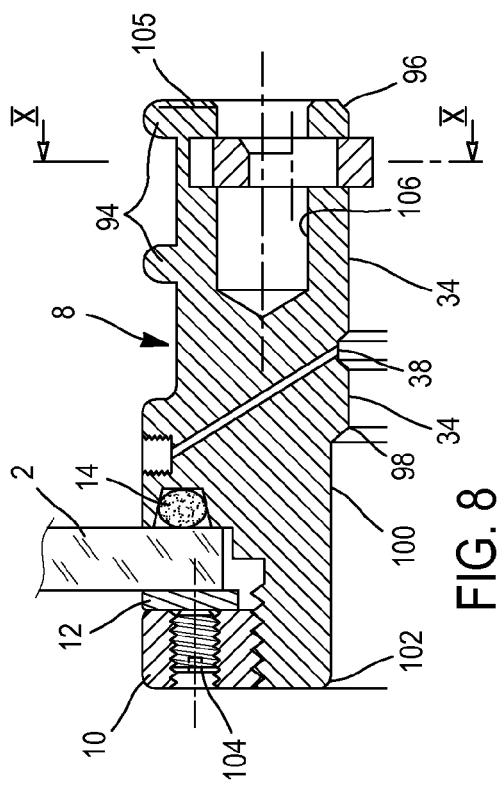

In FIGS. 8a and 8b an exploded view and a view in assembled position, respectively, have been represented of a variant embodiment of a chamber ring specially intended to be mounted on a glass wall 2. To this end, a cushioning seal 13 is positioned between bearing washer 12 and glass wall 2. The cushioning seal includes a dirt flap 15. As with the embodiment of FIG. 8, a nut 10 is screwed on to chamber ring 8. Pressure screws 104 are screwed in nut 10 and rest on bearing washer 12. On the other side of glass wall 2 is a special joint including a roll which fits into a groove of the chamber ring and which, on the other side of the roll, comes to rest on glass wall 2. Joint 17 also includes a dirt flap 19.

Figure 12:
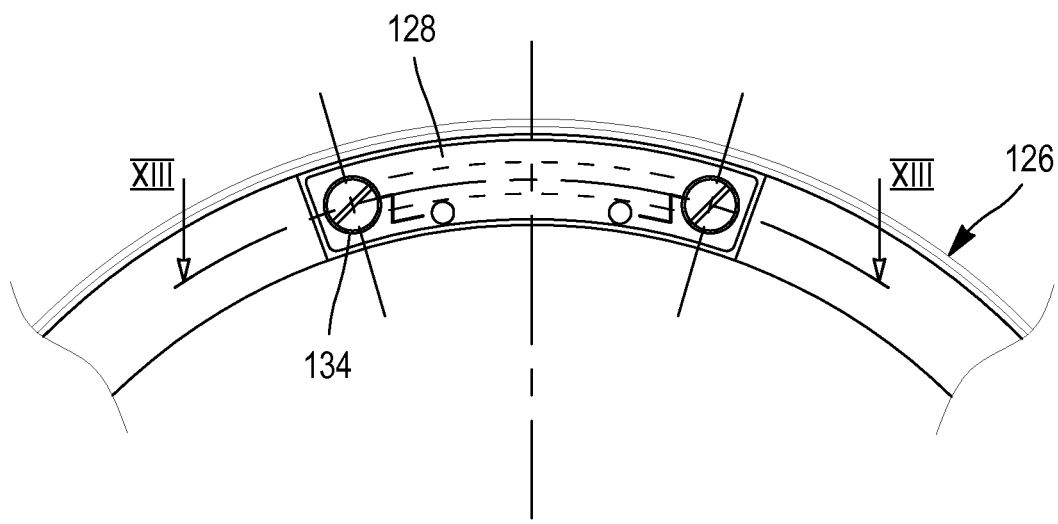
FIG. 12 is a partial elevation view of a retaining ring which intervenes on the immobilisation bolts, in the course of operation.
Figure 13:
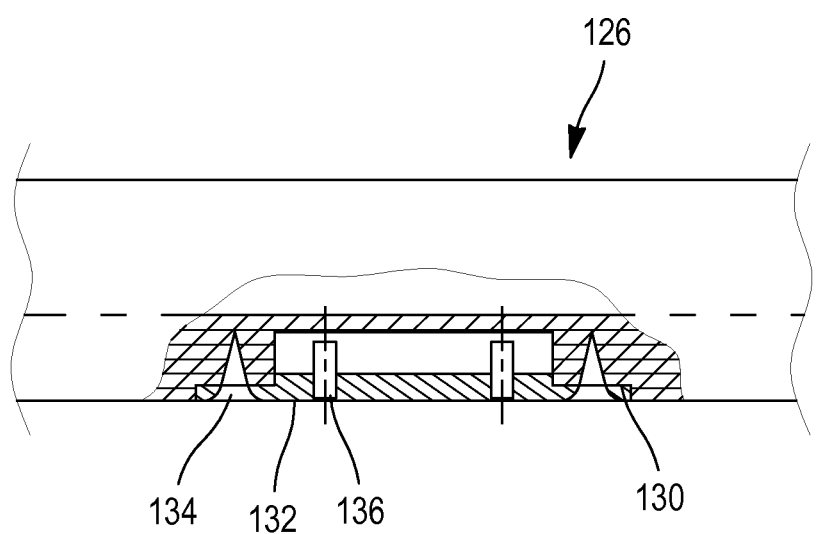
FIG. 13 is a section view along line XIII, XIII of FIG. 12.

FIGS. 12 and 13 represent an intervention retaining ring 126 (contained in a retaining ring 20) for use in a low-pressure chamber or for use in a high-pressure chamber. The intervention retaining ring includes three recesses 128. A slot 130 enables movable plate 132 attached by two screws 134 on the body of retaining ring 126 to be received.

Slugs 136 enable recesses 68 to be reconstituted in the case of the retaining ring for a low-pressure chamber. Slugs 136 do not exist in the case of a high-pressure chamber. Indeed, in this case recesses 68 are replaced by a groove 40.

The three movable plates 132 allow, with the retaining ring in position in the chamber ring, bolts 28 to be accessed one-by-one by disassembling a plate 132 by removing screws 134. If required, this enables the defective parts of the bolt to be replaced, by removing slugs 112, bolt 28 and springs 115, and by replacing them without any breach of containment. Small plate 132 and screws 134 are then reassembled. After this assembly has been used the plates can be recycled.

Figure 19:
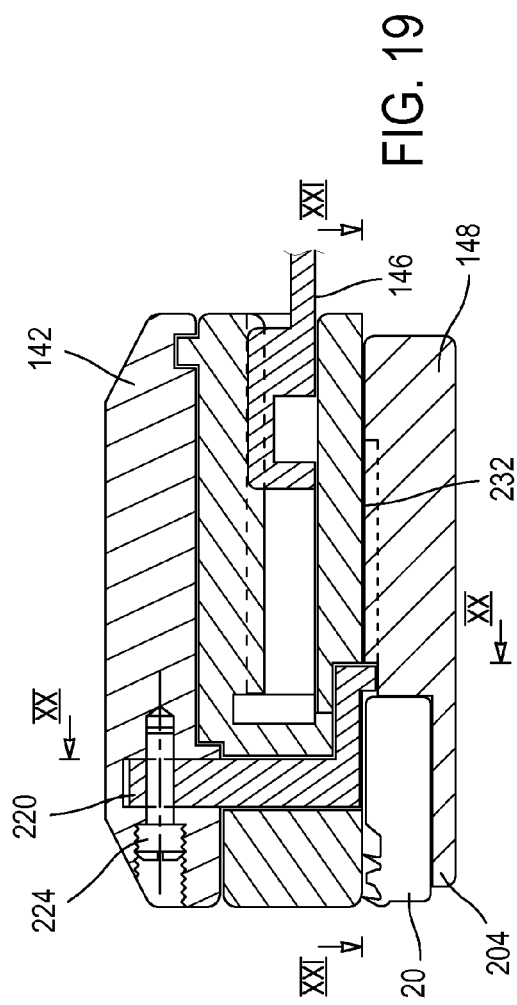
FIG. 19 is another lengthways section view of the ejection gun showing the safety system which prevents the retaining ring from being positioned unless the ejection gun is correctly locked and the bolts disengaged.

In FIGS. 14, 16 and 19 reference 140 designates the ejection gun. It consists of four main parts, namely a control sheath 142, a nut body 144, a piston control screw 146 and a piston 148.

Retractable pin 150 acts on bolt 28 of chamber ring 8. When the retractable pin penetrates in the bolt's control hole 116, it exerts an upward force on this bolt against the thrust of springs 115, and causes it to move backwards and out of recesses 26 of retaining ring 20. This movement can occur only after partial 45° gripping of the ejection gun on the chamber ring. This safety is provided by a cam 152 represented in FIG. 15. This cam 152 is machined inside control sheath 142. A driving pin 154 slides inside cam 152. Driving pin 154 is screwed into retractable pin 150. A slot 156 is made in body 144 to guide pin 154 in a translation movement. It can be seen in FIG. 15 that a first portion of the cam, extending roughly over a 10° angle, is roughly rectilinear. The second portion of the cam is inclined roughly at 45° relative to the first portion. Consequently, the retractable pin covers bolt 28 of recess 26 only after the partial 45° gripping of the ejection gun on the chamber ring. Under the action of a 20° rotation of the control sheath a partial gripping phase is obtained over a half-displacement; simultaneously, the end of the gripping action and the emergence of the retractable pin, which covers bolt 28 over the second half-displacement, and the control of the second safety, called the ejection safety, allow the retaining ring to be positioned in the chamber ring if, and only if, the first two conditions are met.

In FIG. 14 in the axis of the upper vertical retractable pin, control sheath 142 has a marker line 158 which cooperates with marker line 105 of retaining ring 8. When these two marker lines are facing one another the ejection gun is correctly angularly aligned with chamber ring 8. As can be seen in FIG. 16, locking tenons 160 are assembled rotating in nut body 144. They are held axially by a full dog point screw 162 which slides in a groove 164 formed between two shoulders. End 165 of tenon 160 acts as a centring attachment on chamber ring 8. Tenon 160 is coupled with a connecting rod 166 through a square fitting 168. A cylindrical centring pin 170 extends square fitting 168. Cylindrical pin 170 allows tenon 160 to be centred in a bore 172 in body 144 of the ejection gun. Connecting rod 166 is connected to the control sheath by a threaded spindle 174 which slides in a slot 176 made in connecting rod 166. A check screw 177 prevents spindle 174 from becoming unscrewed.

Figure 22:
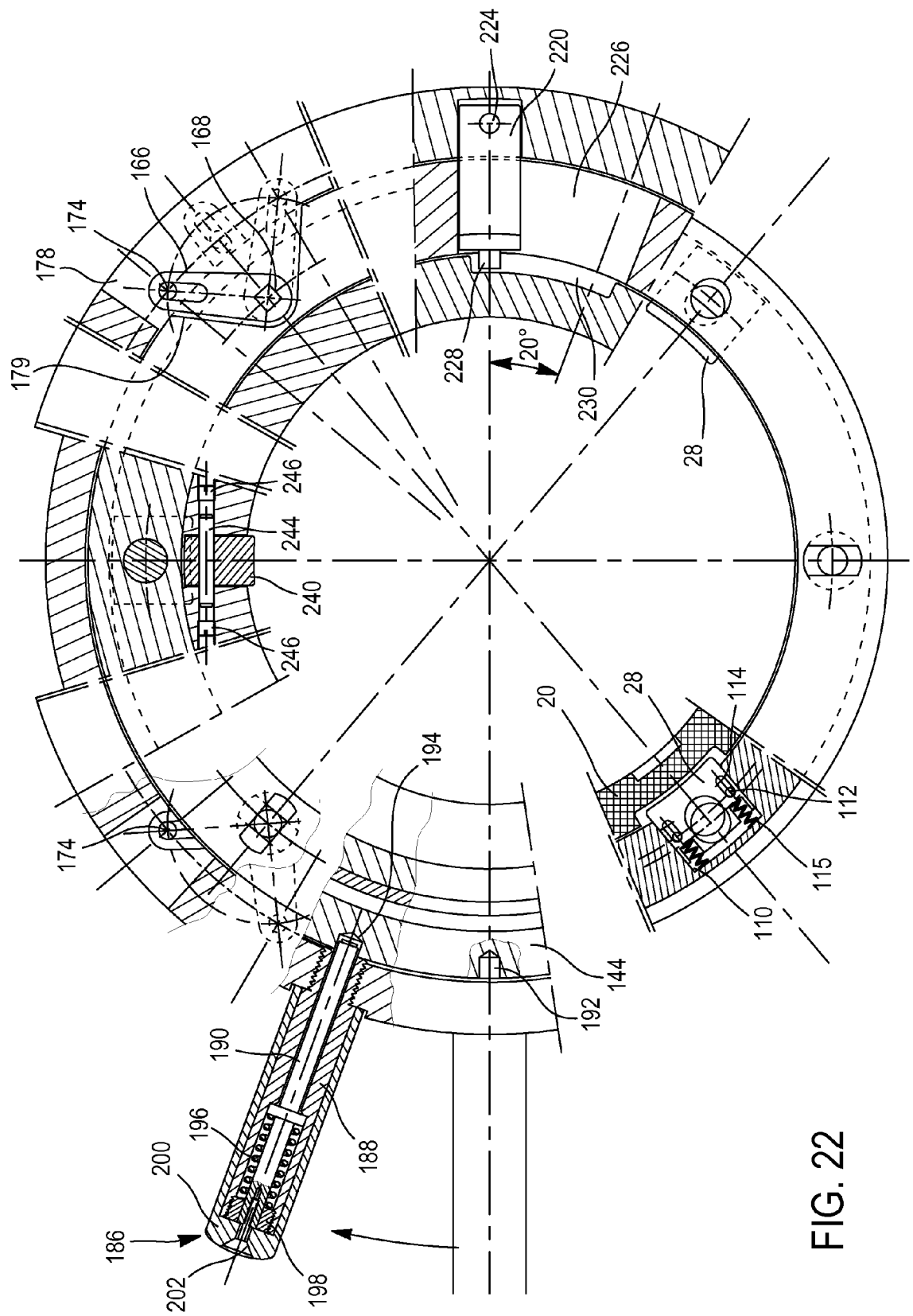
FIG. 22 represents a view of the rear of the ejection gun in the area of the chamber ring, showing the orientations of the various members of this ring, and also those of the chamber ring. The right-hand upper quarter represents the ejection gun in its presentation position under the chamber ring. The right-hand lower quarter represents the chamber ring alone. The left-hand lower quarter represents a section view of the retaining ring in its position in the chamber ring immobilised by one of the bolts. The left-hand upper quarter represents the ejection gun in its position locked on the chamber ring.
Figure 33:
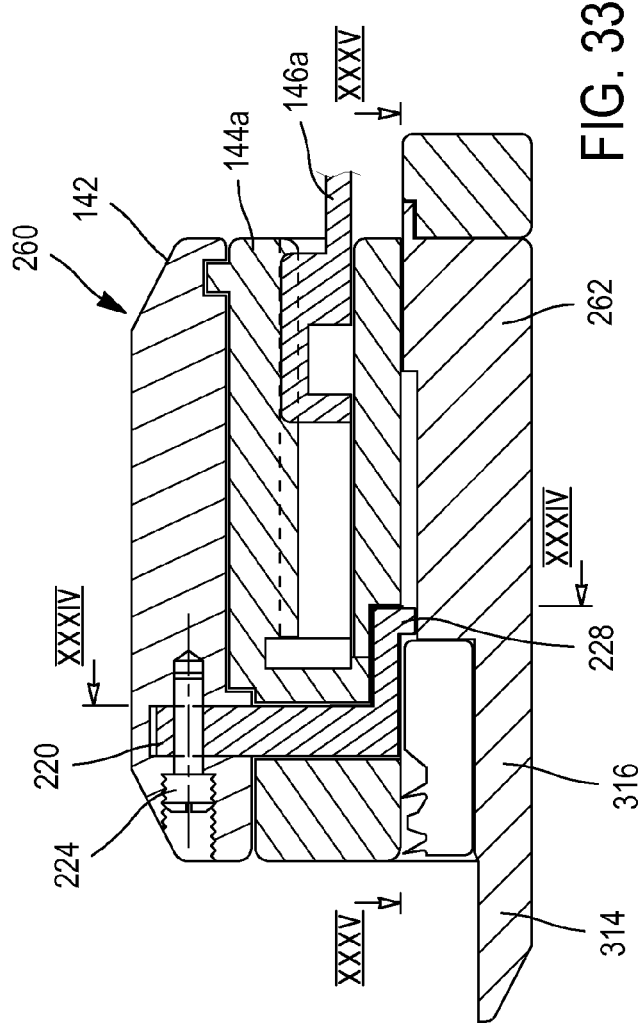
FIG. 33 represents a safety identical to that of FIG. 19 adapted for extraction.

Control sheath 142 acts on connecting rods 166, by a rotation of 20° around nut body 144; a slot 178 made in control sheath 142 and a V-shaped recess 179 (see FIGS. 18 and 22) allow the 90° angular displacement of connecting rod 166 around its axis 180.

Control sheath 140 is held axially on nut body 144 by a male bayonet connection 182 which slides in a female bayonet connection 184 of control sheath 142. Two handles 186 allow ejection gun 140 to be presented on chamber ring 8. These two handles are diametrically opposite on control sheath 142. By convention they are positioned in a horizontal plane. To enable them to be represented, a handle has been represented in FIG. 14 flattened out in the plane of the figure. At least one of the two handles 186 includes an indexing mechanism. It includes on its body 188 a bore in which is received a shouldered rod 190, the end of which acts as an indexing system for holes 192 and 194 located in nut body 144 (see FIG. 22).

Handle body 188 is attached by thread and internal threading on control sheath 142. Shouldered rod 190 is subject to a continual thrust action by a spring 196. The spring's reaction is balanced by a handle nut 198 screwed into handle body 188. A handle sheath 200 is attached by a screw 202 to the end of supported rod 190. The kinematics of this indexing handle is traditional. Sheath 200 need merely be pulled in the direction of arrow f to release the indexing system from one of the holes 192 or 194. The rotation of the control sheath is then controlled using both handles, and it is released at the end of the displacement before indexing it in a new position. The displacement of the handle is, for example, 20°.

FIG. 16 illustrates the control kinematics of piston 148. The front of the piston is terminated by a tongue 204 which receives the retaining ring. The rear of the piston includes at least three wheel brackets 206 each of which consists of a supporting spindle 208, a stop screw 210 for adjusting the ejection displacement, and a wheel 212 mounted pivoting on supporting spindle 208. Supporting spindle 208 is held in place by a full dog point screw 214. Piston 148 is stopped from rotating relative to nut body 144 by wheel bracket 206 forming in its upper portion a tenon 216 sliding in a slot 218 made inside body 142 (see FIG. 17).

Figure 21:
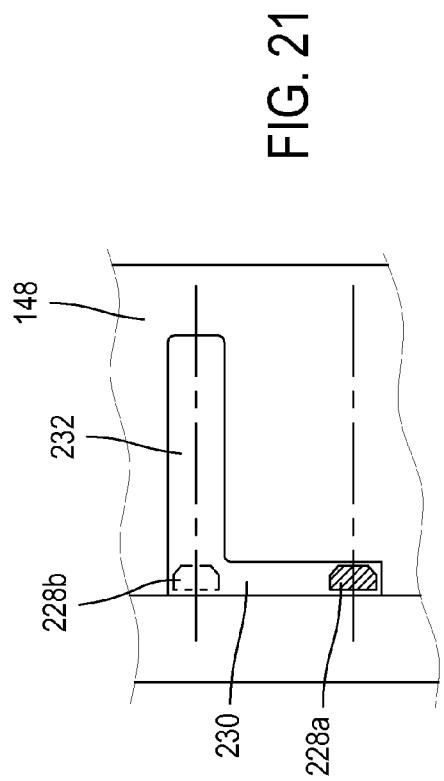
FIG. 21 is a section view along line XXI, XXI of FIG. 19.
Figure 20:
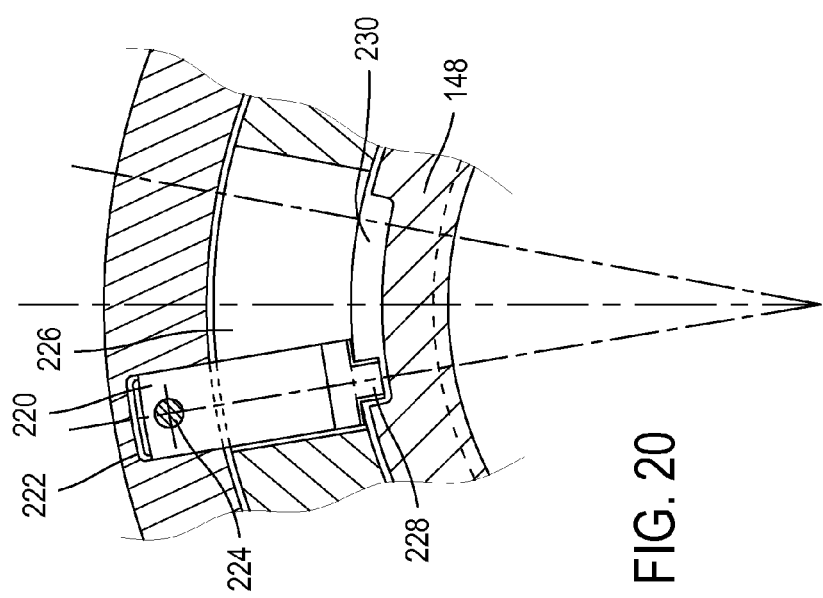
FIG. 20 is a section view along line XX, XX of FIG. 19.

FIG. 19 represents the operation of the safety called the ejection safety. This safety is directly coupled to control sheath 142. Its aim is to prevent ejection of the retaining ring if the ejection gun is not positioned in the final lock position. With this aim, a foolproofing system 220 is fitted in a housing 222 (see FIG. 20) of control sheath 142. The foolproofing system is attached in the control sheath by a washer head screw 224. Angular displacement of foolproofing system 220 in nut body 144 is made possible by the presence of a slot 226 formed in the nut body. The foolproofing system is terminated by a catch 228 which slides circumferentially in a groove 230 made in piston 148. In FIG. 21, which represents a section along line XXI, XXI of FIG. 19 catch 228 can be seen in presentation position 228a of the ejection gun on the chamber ring. After an angular displacement of 20° catch 228 is in position 228b. In this position the ejection gun is in the final lock position. Catch 228 is therefore in the axis of a lengthways slot 232, which allows axial displacement of the piston over a distance at minimum identical to the displacement of the piston corresponding to the ejection of the retaining ring. This position allows the axial translation of piston 148 due to annular screw-nut system 234 (see FIG. 14).

Control screw 146 moves in an annular recess 236 made in nut body 144. At one end of the recess an annular groove 138 receives wheels 212. At the other end it receives a flywheel 238 enabling control screw 146 to be rotated. The control screw moves piston 148 in a forward or rear translation movement. The rotation reaction is transferred by the locking points of the ejection gun on to chamber ring 8. Three automatic systems for holding retaining ring 20 on tongue 204 of piston 148 make its position on ejection gun secure 140 almost for the entire duration of its displacement. These systems consist of a hook 240, the front portion of which moves to take retaining ring 20 by its recesses 68. The hook is housed in a recess 242 allowing it to be displaced angularly around its spindle 244. Spindle 244 is stopped radially by screws 246 (see FIG. 22). A spring 248 releases hook 240 from the retaining ring in the final ejection position. The rear of hook 240 is terminated by a rounded shape 250. When the piston moves back, the inclination 252 of recess 254 causes the hook to pivot in a clockwise direction such that this hook becomes engaged in recess 68 of retaining ring 20, and consequently holds it during its displacement. Internal bore 256 of nut body 144 allows the retaining ring to pass without hindrance over its external profile, in order to prevent any damage to the sealing lips.

In FIGS. 22a and 22b the assembly of a ball-and-socket joint 376 on chamber ring 8 has been represented. This assembly is represented in an exploded position in FIG. 22b, and in an assembled position in FIG. 22a. The ball-and-socket joint is assembled in a frame 378 and is held in this frame by a shell ring 380. A rod 382 traverses ball-and-socket joint 376. Rod 382 carries at its end a remote manipulator arm 384. A manipulator bellows 386 provides the seal between rod 382 and chamber ring 8. Rod 382 is held in the ball-and-socket joint by a tightening nut 388. The ball-and-socket joint, which is preferably made of plastic, grips on to the locking points. Control ring 390 causes the three tenons to rotate.

With a rotation of approximately 30°, it initially causes the locking bolts to move through a half-displacement, and simultaneously causes locking to continue and the retaining ring to be handled by recesses 68.

Two ball handles with an indexing system enable this assembly to be maintained, either in a locked position on the chamber ring, or in a presentation position.

In FIGS. 22c, 22d and 22e a safety plug in the event of the accidental breakage of the interchangeable element has been represented. This safety plug may be applied from the outside at any time on to chamber ring 8. The safety plug includes a closing plate 392. This plate includes three tenons 394 which are terminated by a driving square 396. The ends of the tenons penetrate into centring holes 398. An O-ring 400 provides a seal between closing plate 392 and tenon 394. In addition, a sealing skirt designated by reference 402a in storage position and by reference 402b in seal position provides a seal between closing plate 392 and chamber ring 8. Three centring slugs 404 penetrate into the bolt holes. These slugs are short, such that bolts 28 are not raised, as this would cause the retaining ring to be unlocked.

A five-branched star 406 is assembled pivoting on closing plate 392 around a central pivot 408.

Three of these branches correspond to tenons 394. They include a slot 410 in which slides a spindle mounted at the end of a connection rod 412. Connection rod 412 is mounted on tenon 394 through a driving square. The other two branches 414 support at their ends a control ball 416 with an index. In a similar manner to that described in connection with handles 186, an index made to emerge from an index hole by pulling ball 416. Star 406 is pivoted through approximately 30° to cause it to change from the presentation position to the locked position, corresponding to a 90° rotation of connecting rods 412 and, consequently, of tenons 394, which are coupled with the connecting rods. The index then penetrates into another index hole 418.

The invention also concerns an extraction gun designated by reference 260, which will now be described with reference to FIGS. 23 to 35. This extraction gun applies particularly in the case of high-pressure chambers with a sterile atmosphere. To interchange the interchangeable element, the procedure is as follows.

In the containment chamber a sealed plastic bag is introduced containing the interchangeable element, after the assembly has been previously sterilised by radiation, for example. The outside of the bag is then sterilised in a sterilisation airlock, for example by chemical means. The entire assembly is transferred by a "double-door" container system for sealed transfer into the containment chamber.

Using the manipulation means, the ready-to-use interchangeable element is removed from the bag. The extraction gun is connected to the chamber ring which is to be changed. The retaining ring of the interchangeable element is slid from the inside on to the end of the piston, matching up the markers. This operation is accomplished by the second glove, available in addition to the one which will be changed, by passing a hand through the centre of the extraction gun.

The extraction gun consists of an ejection gun 140, to which particular modifications are made, which will now be described.

The extraction gun (see FIG. 23) consists of a locking control sheath 142 and a modified nut body 144a, where the control sheath is assembled rotating on the nut body. The extraction gun 260 also includes an extraction piston 262 assembled sliding in nut body 144a and a modified piston control screw 146a, where the extraction piston 262 includes a tongue able to receive two retaining rings.

There is a bolt cam 264 on extraction piston 262. This bolt cam is able to pivot through 90° under the action of a control ring 266. The bolt cam is coupled with a bolt shaft 268 on to which are attached cleats 270 and 270a. Cleat 270 is positioned on the inside of the chamber, and cleat 270a on the outside of the chamber. Bolt cam 264 has been represented in greater detail in FIG. 28. The mobile bolt cam rotating around shaft 268 includes a small catch 272 and a large catch 274. The extreme position of bolt cam 264 has been represented by dotted lines. There are two recesses on nut body 144a for the angular displacement of bolt cam 264. Small-width recess 276 traverses all through nut body 144a. It allows large catch 274 of nut body 264 to pass. Recess 276 is extended into piston control screw 146a. The recess continues into the control screw by a recess 278. This recess enables large catch 274 to immobilise control screw 146a in relation to body 144a and to extraction piston 262 in a preferential position with the piston advanced and cleats 270 and 270a covered.

In the piston's advanced position, cleats 270 and 270a are mechanically covered for safety. This operation occurs automatically, and cannot be overridden by the operator.

The second large-width recess 280 allows small catch 272 to be received when bolt cam 264 pivots (the width of the small catch is greater than the width of large catch 274). The position of small catch 272 represented in FIG. 28 is the position of cleats 270 and 270a engaged in groove 40 of retaining rings 20. This position allows them to be extracted by pulling back extraction piston 262 due to the continuity of lengthways angular displacement of small catch 272 in slot 258, preventing any pivoting of these cleats, or their control.

Figure 35:
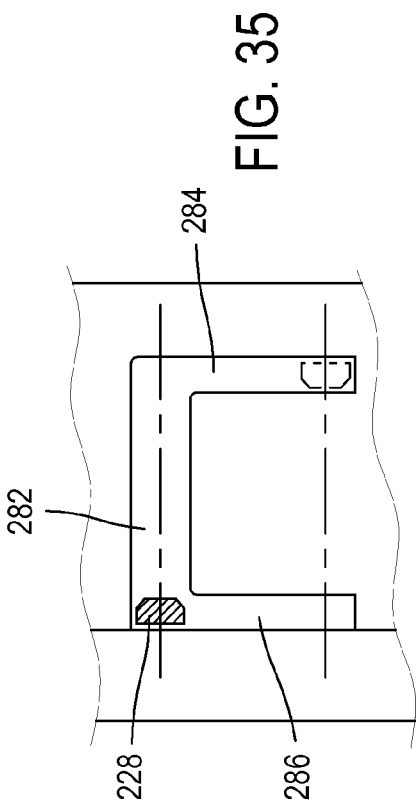
FIG. 35 represents a rectified diagram section view along line XXXV, XXXV of FIG. 33.
Figure 34:
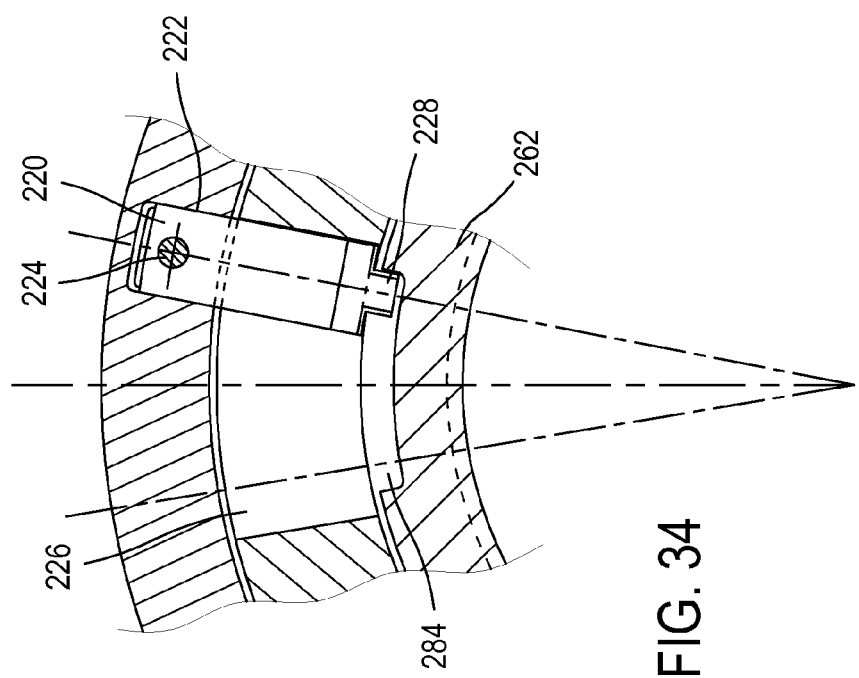
FIG. 34 represents a section view along line XXXIV, XXXIV of FIG. 33.
Figure 36:
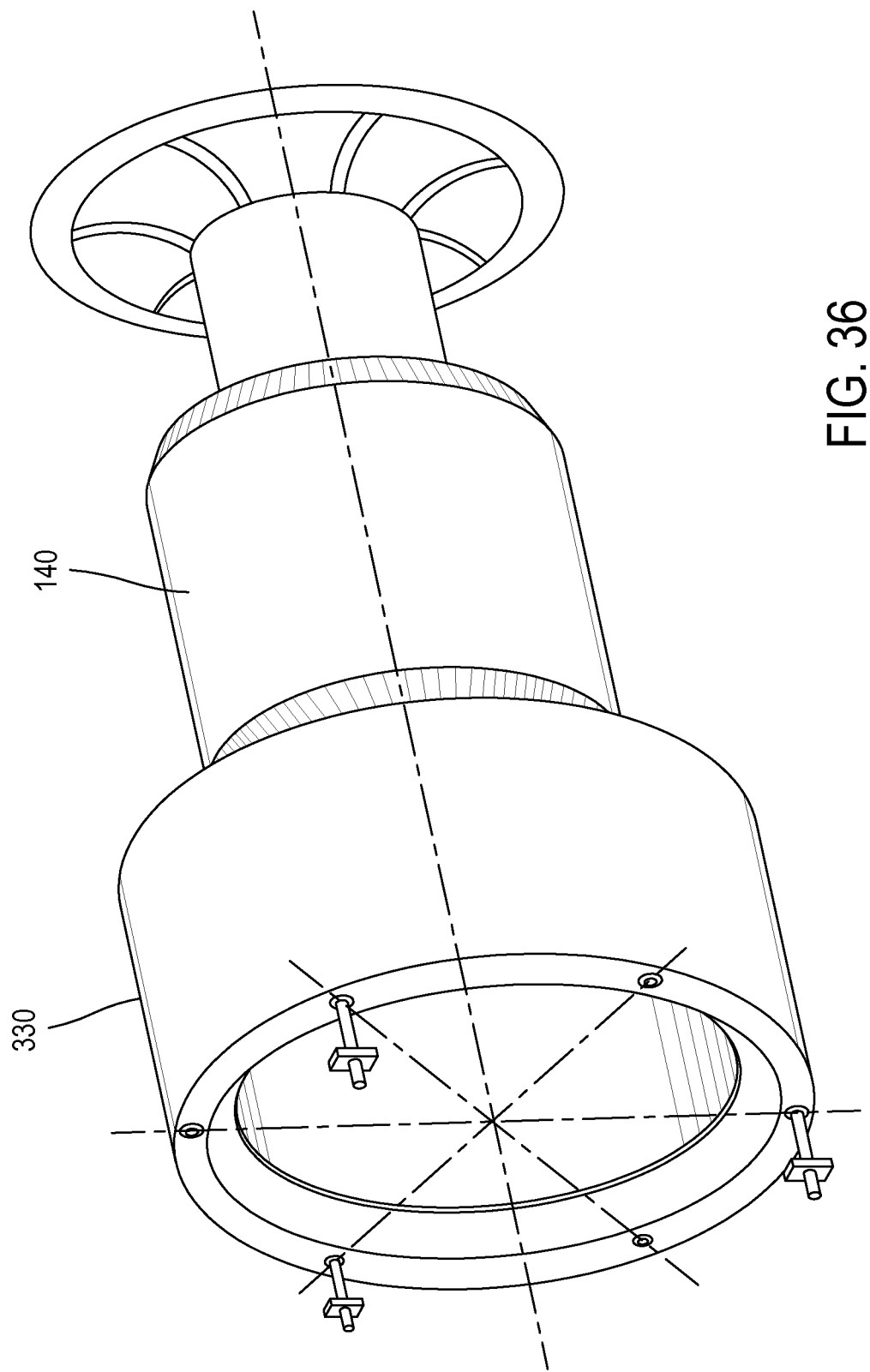
FIG. 36 represents an additional module for an oval chamber ring which can be adapted on the basic ejection gun for a circular chamber ring, thus avoiding use of a specialised gun.

Extraction piston 262 has a lengthways slot 282 extended at each of its ends by a perpendicular slot 284 and 286 (see FIG. 35). As was previously described in relation to the ejection gun, a foolproofing system 220 is fitted in a housing 222 on the control sheath, and it is attached to the latter by a washer head screw 224. It is terminated by a catch 228. Catch 228 slides in lengthways slot 282 and in both transverse slots 284 and 286. Slot 286 allows the angular displacement of catch 228 when the ejection gun is in the final lock position, allowing extraction piston 262 to be displaced. The ejection gun is locked on the chamber ring in the same manner as that which was described concerning the ejection gun.

By this means, any risk of breach of containment is prevented, from the moment when the extraction gun is presented until the moment when the retaining ring is extracted, and until the moment when it is replaced by a new retaining ring including a new interchangeable member. As was previously explained, extraction piston 262 includes a system for controlling and handling retaining rings 20 at a minimum of three points. The system includes a control ring 266 which can be angularly displaced by 15°, for example. The angular displacement of control ring 266 is limited by a mechanism consisting of shouldered slots 288 in which holding washer head screws 290 are screwed. The washer head screws allow a maximum angular displacement of 15° for example (see FIGS. 29 and 30). This angular displacement of 15° allows bolt cam 264 to be pivoted through an angle of 90°. To this end, slug 292 (FIG. 32) slides in slot 294 during the 15° rotation of control ring 266 (see FIG. 28).

Slug 292 is fitted in control ring 266. Two control handles 296 attached by screws 297 on control ring 266 allow the ring to be rotated, which drives bolt cam 264 through 90°. By convention, the two handles 296 are horizontal, in the same way as the handles referenced 186 in the presentation position of extraction gun 260 on chamber ring 8. At least one of these control handles 296 includes an indexing mechanism. This mechanism has been represented in greater detail in FIG. 31. The indexing mechanism includes a lever 298 which rotates around an axis of rotation 300 held in the cover in body 318. Lever 298 includes a fork 302. An index rod 304 is able to move axially inside control mechanism 296. Index rod 304 includes at one end an axle rod 306 which penetrates into fork 302. A force is exerted on index rod 304 by a helical spring 308 which rests on a shoulder of the index rod. At its other end, index rod 304 includes an index 310 which penetrates into an index hole 312. A rotation of lever 298, for example through 40° anticlockwise, enables index 310 to be extracted from index hole 312. It is then possible to rotate the control ring by 15°, and this angular displacement is limited by the shouldered slots of ring 288 (FIG. 30). During this movement, helical spring 308 is compressed. After a rotation of 15°, for example, lever 298 is released. Spring 308 is released and index 310 penetrates into a second index hole 320.

Retaining ring 20a is the element to be interchanged. Cleat 270a penetrates into groove 40. The new retaining ring 20 is handled by the penetration of cleat 270 in groove 40 of retaining ring 20 through glove 24a of member 20a, to make allowance for the thickness of this skin. The second portion 314 of tongue 316 is reduced over the length of the retaining ring to be put in place by a break in alignment 314 (see FIG. 33).

The retaining rings can be handled by rotating handle assembly 318 and control ring 266, by moving index 310 from the hole referenced 320 to the hole referenced 312 (see FIG. 28). These operations can be accomplished only if the new element is correctly positioned. This is possible only if the new retaining ring is correctly positioned on break in alignment 314. Indeed, cleat bolt 328 stops rotation of cleat 270 in its covered position. In this manner, retaining ring 20a, which is to be removed, does not receive cleat 270a, preventing it from being extracted and a containment breach from being created. Correct installation of retaining ring 20 requires that the latter is in a support position against retaining ring 20a and parallel to the latter in order that the action of retaining ring 20 on the cleat bolts ensures that cleat bolts 328 are covered by the front protrusion of retaining ring 20. Cleat 270 can then pivot in relief groove 326 driven by control ring 266 by disengaging index 310 by pressing on lever 298 and rotating control handle 296 from hole 320 to hole 312 (FIG. 28). The bolt is permanently returned by a spring blade 322 attached by screws 324 (FIGS. 25 and 26).

In FIG. 24 a section view along line XXIV, XXIV of FIG. 23 has been represented. This figure represents a cam profile 152 in which a driving pin 154 is moved. As was previously explained concerning the ejection gun, the first portion of the cam is roughly rectilinear (over a 10° displacement, for example). The second portion of the cam is inclined at 45° relative to the first portion over a 10° displacement.

The invention also concerns an oval chamber ring. It includes a chamber ring and a retaining ring of oval section. The device includes an ejection gun 140 similar to the one described previously coupled to an additional module 330.

Figure 42:
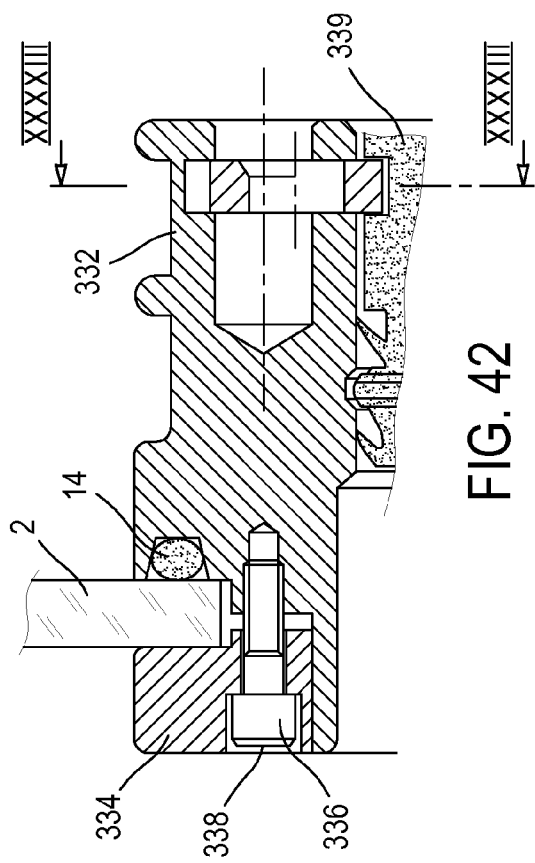
in FIG. 42 a section view of a portion of an oval chamber ring has been represented.

In FIG. 42 the assembly of oval chamber ring 332 on the wall of sealed chamber 2 separating a volume inside chamber 4 from a space outside chamber 6 has been represented. The portion of wall 2 illustrated in FIG. 42 includes an oval passage in which a chamber ring 332 is attached in sealed fashion. A gasket seal 14 is pressed tightly by a counter-ring 334 tightened by securing screws 336. Screws 336 are blocked by a dirt cover 338, for example silicon mastic.

Figure 43:
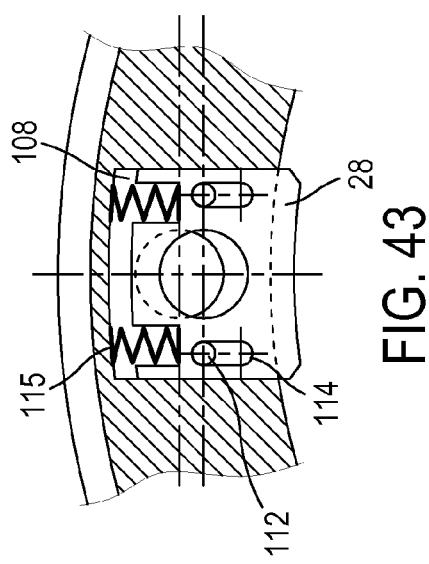
in FIG. 43 a section view along line XXXXIII, XXXXIII of FIG. 42 has been represented.

A portion of oval retaining ring 339 of identical section to circular retaining ring 20 has been represented. The same system for immobilising the retaining ring as for the circular ring is found (FIG. 43). As previously explained, this immobilisation system consists of three or more bolts 28. A force is exerted on each bolt 28 to bring it out of its housing 108 by two parallel springs 115 positioned either side of the bolt shaft. Displacement of the bolt is limited by bolt stops 112 which slide in bolt stops' slots 114 (see FIG. 43).

Figure 44:
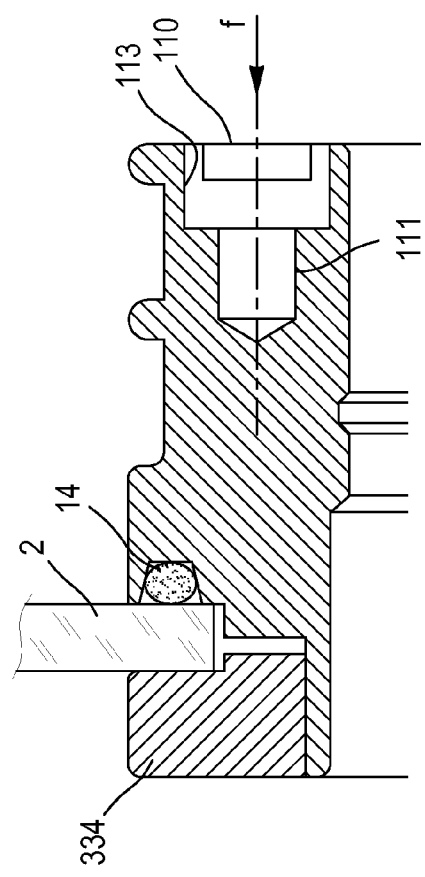
in FIG. 44 a section view of the oval chamber ring represented in FIG. 42 has been represented according to a different section plane.
Figure 45:
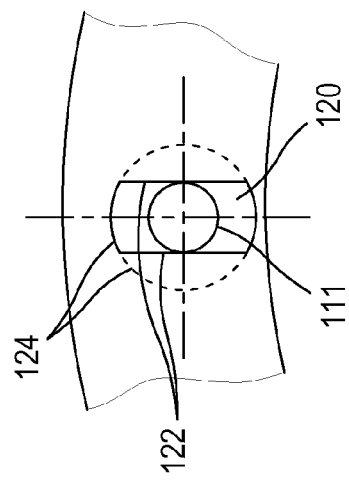
in FIG. 45 a side view of the oval chamber ring represented in FIG. 44 has been represented along arrow f.

Three locking sockets 110 (FIGS. 44 and 45) allow the tenons of ejection gun 140 to be received. A hole 111 is followed by a bore 113 allow the tenon to rotate from its vertical position to a horizontal position, equivalent to a rotation of 90°. Mortise 120 consisting of its two sides 122 joined by a circle arc of the same diameter as the diameter of bore 124 allows the tenons of the ejection gun to penetrate.

Figure 37A:
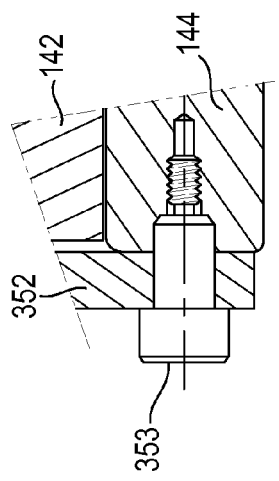
FIG. 37a is a detail view showing a centring screw.
Figure 37:
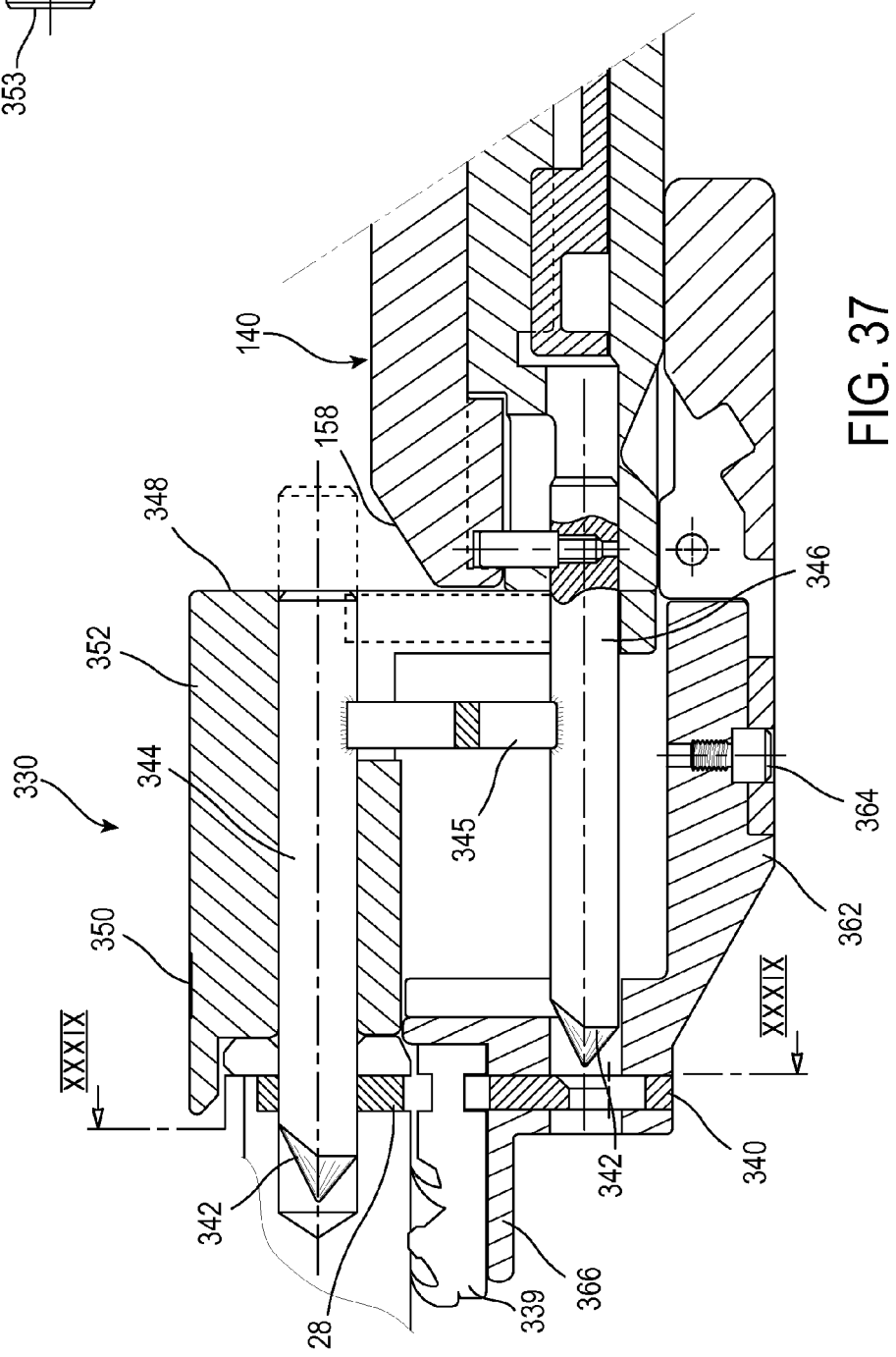
FIG. 37 represents a lengthways section view of the unlocking of the bolts of the oval chamber ring by the staggered retractable pins and the pins controlling the oval piston bolts for holding the retaining ring along section line XXXVII, XXXVII of FIG. 46.

In FIG. 37 the transfer of the controls of ejection gun 140 to the additional module 330 for oval chamber ring 332 has been represented. Retractable pins 150 have been replaced by a dual-action pin 346. Pin 346 is duplicated by a second pin 344. Pin 346 allows bolt 340 to be controlled, and pin 344 allows bolt 28 to be controlled.

Pins 344 and 346 are terminated by a conical end 342.

A tab 345 connects the first pin to the second pin. When the piston returns, i.e. when it is withdrawn to a rear position of the ejection gun, first pin 346 allows the retaining ring to be secured temporarily on its piston.

The ejection gun includes a marker line 158 and module body 352 includes a corresponding marker line 348. When marker lines 158 and 348 are aligned, the ejection gun is positioned angularly in correct fashion relative to the module body. Marker line 348 is doubled by a marker line 350 located on the periphery of module body 352. The angular orientations of marker line 348 and marker line 350 are identical.

In FIG. 38 a second assembly of dual-action retractable pins 354 has been represented. This second assembly exists as a duplicate, either side of the vertical axis. A tab 356 connects pin 358 to pin 360. Pins 358 and 360 are terminated by a conical end 342. Pin 358 allows bolt 28 to be covered, while pin 360 allows bolt 340 to be covered. The three hooks 240 have been removed from piston 148 of ejection gun 140.

Ejection gun 140 is ready to receive module 330. To accomplish this, module body 352 is slipped on to the dual-action pin assemblies as far as the stop on nut body 144, and it is attached by centring screws 353 (see FIG. 37a).

Piston 362 is fitted with its three bolts 340. Bolt 340 is held in its angular displacement by bolt stops 112.

Fitted piston 362 is engaged inside module body 352 and on tongue 204 of the piston, and then attached by screws 364. At its end the piston has a tongue 366 supporting retaining ring 339 (see FIGS. 37, 38 and 39).

Figure 41:
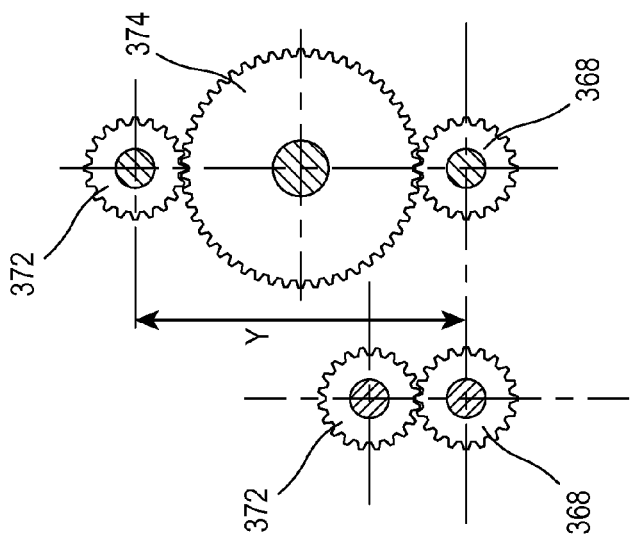
in FIG. 41 a section view along line XXXXI, XXXXI of FIG. 40 has been represented.
Figure 40:
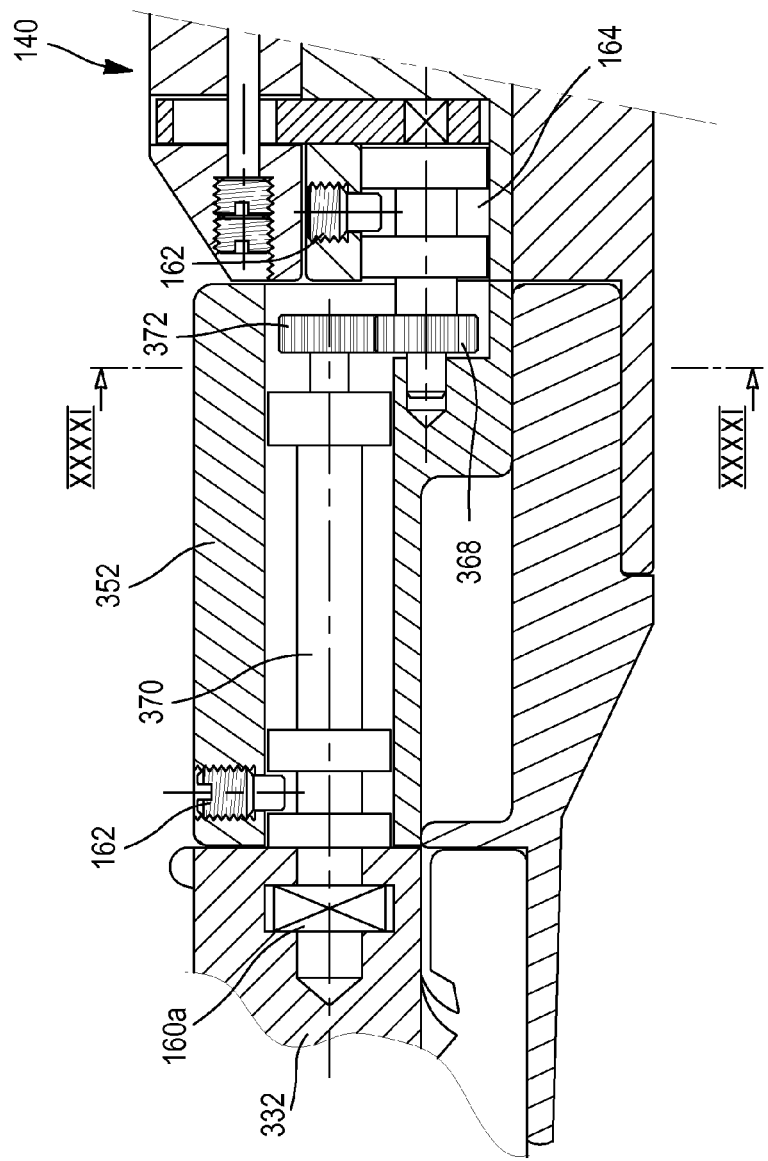
FIG. 40 represents a lengthways section view showing the transfer of the locking tenons.

In FIG. 40 the three locking tenons 160 have been replaced by three gears 368 (see FIG. 16). A gear shaft 370 supporting at its end locking tenons 160a in oval chamber ring 332 includes at its end a gear 372 which engages with gear 368. The ratio between these gears is 1 to 1. In FIG. 41 a section view along line XXXXI/XXXXI of FIG. 40 of the means included for driving the two gears 368 and 372 of centre distance Y has been represented. A transmission gear wheel 374 has been placed between the two gears. Gear 374 is mounted in a housing designed for this purpose on module body 352.

Figure 46:
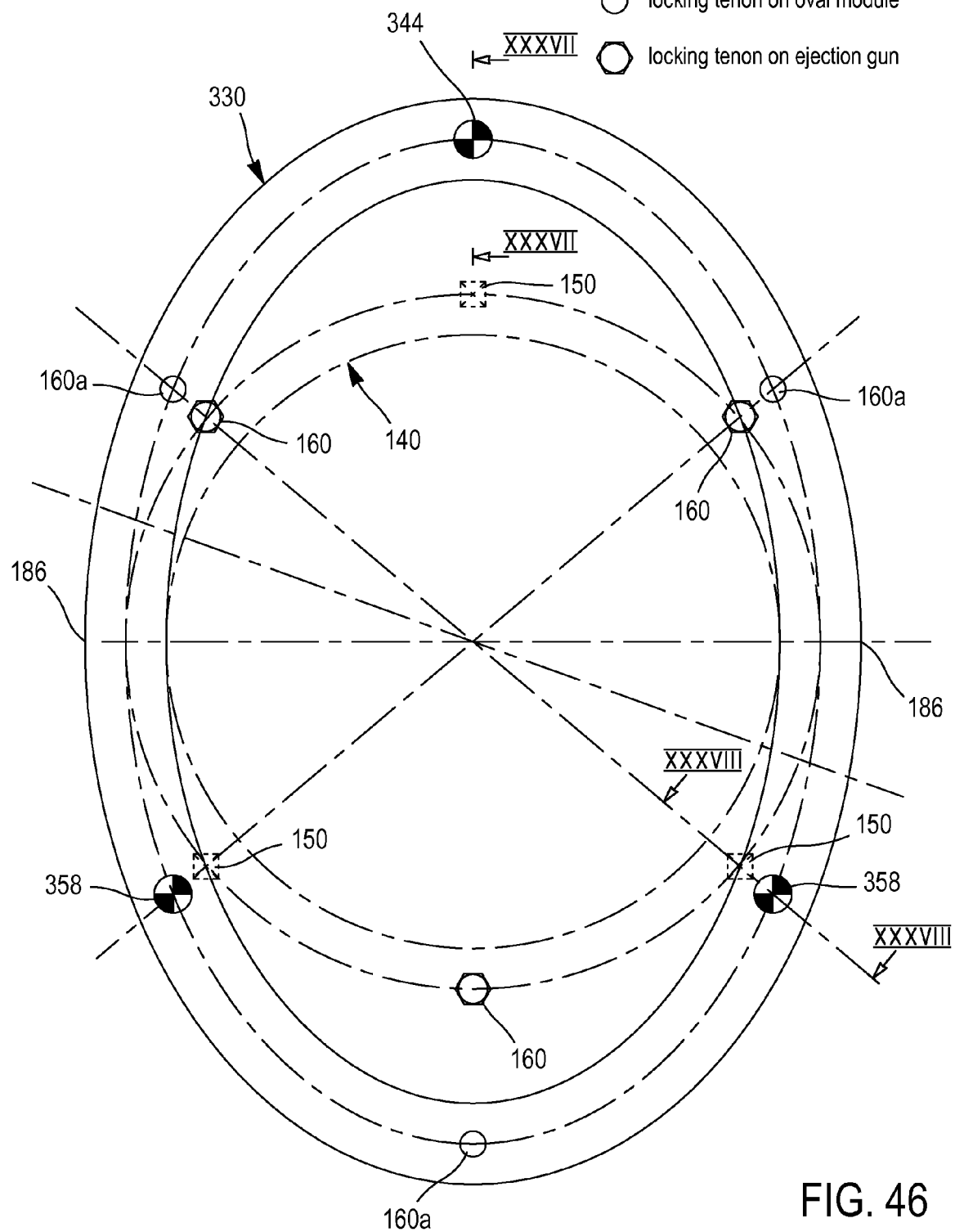
in FIG. 46 a front view of the oval chamber ring and the geometrical situation of the different points have been represented.

In FIG. 46 a front view of an oval chamber ring 332 has been represented. This device includes an ejection gun 140 coupled to an additional module 330. This illustrates the shifts to be taken into consideration between the installations of the bolts and the locking points between a circular chamber ring and an oval chamber ring in order to determine the transfers of the orders between basic injection gun 140 and module 330 illustrated by FIGS. 36, 37, 38 and 40. It is observed in this figure that the angle of the retractable pins 150 and 358 relative to the vertical plane is 50° either side of the latter (100° in total). This angular position allows only a single locking position of the ejection gun.

The horizontal axis of handles 186 has also been represented.

Figure 47A:
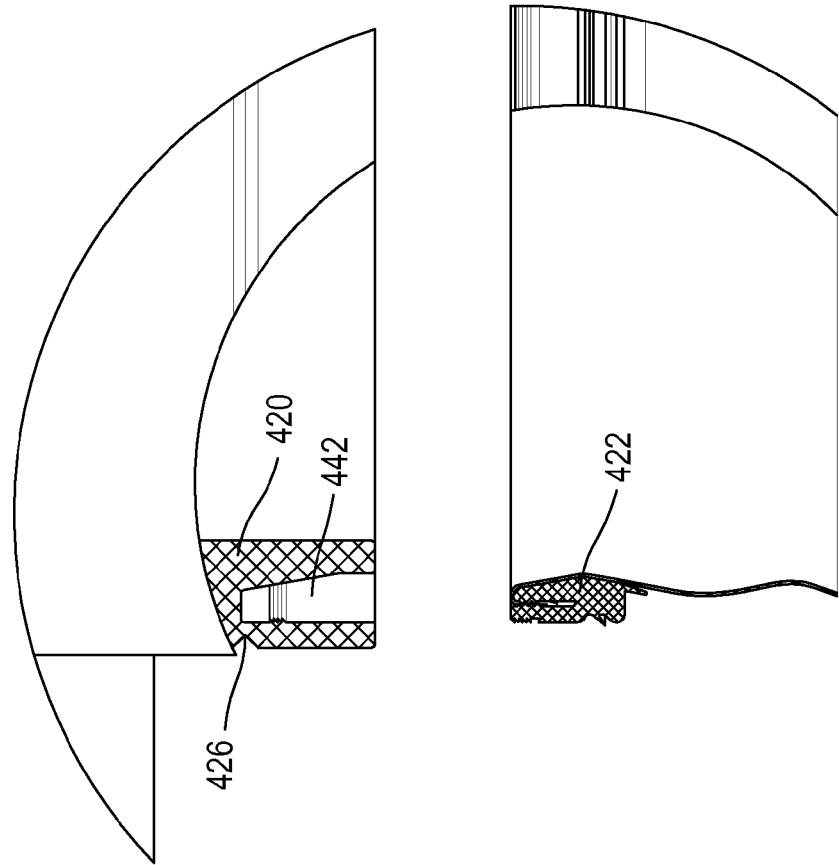
in FIGS. 47a and 47b the use of keys for mounting a bag on container heads of the STUC or DPTE® type has been represented.
Figure 47B:
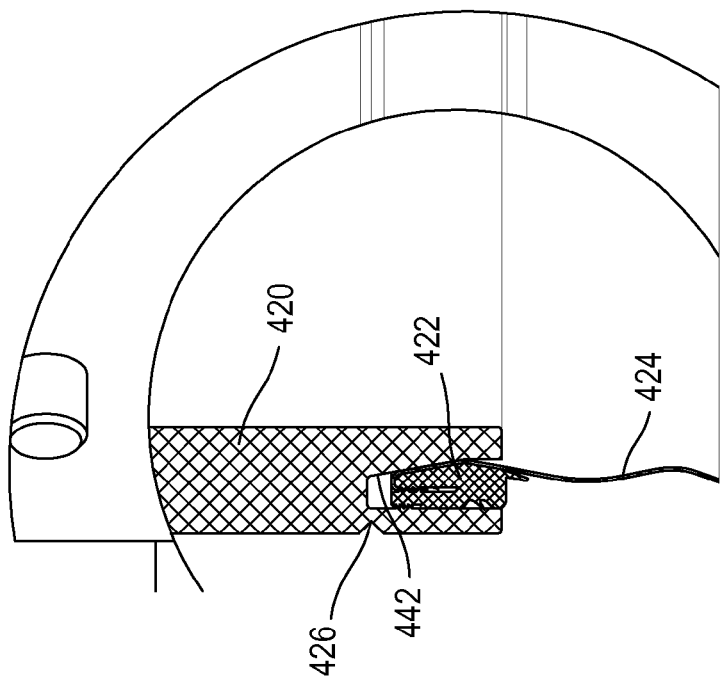

In FIGS. 47a and 47b the use of keys in accordance with the invention has been illustrated for the assembly of a bag on double door sealed transfer heads (DPTE®), where the DPTE® head is a single-use head.

A flange 420 includes a cavity 442 identical to cavity 42 of retaining rings 20. A key 422, identical to key 22 of retaining rings 20 is introduced into groove 442 and assembled by clipping. In FIG. 47a the key before clipping has been represented, and in FIG. 47b the assembled position after clipping has been represented. An end of a bag 424 is pinched between the two jaws of key 422 in a manner identical to that which was described for interchangeable member 24.

A V-shaped leader 426 is provided on flange 420. This leader enables flange 420 to be cut using a tool in order to recover bag 424, which can be reused several times. Flange 420, for its part, is recycled as pellets for other uses.

Naturally, the invention is not limited to the embodiments which have just been described as examples, but on the contrary covers all variants of them. In particular, the members which enable the various bolts to be provided, and those which provide the safeties, can take forms different from those which have been described.

The fastenings of the various chamber rings can also vary. Their lengths can be modified to provide additional biological protection (against neutrons, gamma rays, etc.).

The use of this system can be broadened to the sleeves of commercially available remote manipulator arms.

The possibility of incorporating inter-lip controls or double-wall designs will also be noted. They allow controls under neutral gases, and inter-volumes to be sterilised in place by adequate circulation of these products.

The invention claimed is:
1. An oval-shaped or circular-shaped device for sealed attachment of an interchangeable member in a chamber ring, the chamber ring being mounted on a wall of a containment cell, wherein the device includes an integral retaining ring forming a double-seal in relation to the chamber ring, the integral retaining ring supporting the interchangeable member, wherein the integral retaining ring includes at least three recesses, wherein the chamber ring includes at least three bolts configured to penetrate into the at least three recesses to lock and prevent rotation of the integral retaining ring on the chamber ring, and wherein the chamber ring includes at least three sockets configured to receive locking tenons of an ejection gun.

2. The device according to claim 1, wherein the integral retaining ring includes a cavity configured to receive a key, the interchangeable member being mounted on the key, wherein the interchangeable member includes rolls or is full-skinned, wherein the integral retaining ring includes two lips which form the double-seal in relation to the chamber ring and wherein the integral retaining ring includes a protrusion positioned between the two lips, wherein the protrusion penetrates into a corresponding groove of the chamber ring and axially positions the integral retaining ring relative to the chamber ring.

3. The device according to claim 2, wherein the key is configured to fasten the interchangeable member without a roll, and wherein the key includes a jaw pointing towards an interior of the cavity of the integral retaining ring, wherein the jaw is configured to pinch an end skin of the interchangeable member, and wherein the key includes a flap enabling a flexible interchangeable member to be assembled directly by welding.

4. The device according to claim 1, further comprising a polymerisation agent securing the interchangeable member with the integral retaining ring.

5. An ejection gun for the device according to claim 1, wherein the ejection gun is configured to move the integral retaining ring towards an interior of the containment cell, and wherein the ejection gun is configured to replace the integral retaining ring with a new integral retaining ring, wherein the ejection gun comprises a locking control sheath, a nut body, wherein the locking control sheath is mounted rotating on the nut body, an ejection piston and a piston control screw, wherein the ejection piston is mounted sliding in the nut body.

6. The ejection gun according to claim 5, wherein the ejection gun includes at least three tenons mounted rotating in the nut body, wherein the tenons are locked by being rotated in corresponding mortises in the chamber ring, wherein each tenon includes a square on to which is screwed a connecting rod in which a slot is formed, and wherein a threaded spindle in the locking control sheath traverses the slot such that the threaded spindle rotates the connecting rod by a rotation of the locking control sheath.

7. The ejection gun according to claim 5, wherein the ejection gun includes at least three retractable pins for covering the at least three bolts of the chamber ring which lock the integral retaining ring on the chamber ring, wherein the at least three retractable pins are configured to cause the at least three bolts to emerge out of the at least three recesses of the integral retaining ring, and wherein the at least three retractable pins are coupled with driving pins which slide in cam profiles machined inside the locking control sheath.

8. The ejection gun according to claim 5, wherein a foolproofing system is attached on to the locking control sheath, wherein the foolproofing system includes a catch which becomes engaged in a groove formed in the ejection piston, and wherein the groove terminates with a lengthways slot, the slot being perpendicular to the groove.

9. An extraction gun for the device according to claim 1, wherein the extraction gun is configured to extract the integral retaining ring from an interior towards an exterior of the containment cell, and wherein the extraction gun is configured to replace the integral retaining ring with a new integral retaining ring, wherein the extraction gun comprises a locking control sheath, a nut body, wherein the locking control sheath is mounted rotating on the nut body, an extraction piston mounted sliding in the nut body and a control screw, wherein the extraction piston includes a tongue configured to receive two integral retaining rings.

10. The extraction gun according to claim 9, wherein the extraction gun also includes a retractable pin, wherein the retractable pin includes a driving pin which moves inside a cam profile in such a way that the driving pin moves the retractable pin between an "in" position and an "out" position, wherein the extraction piston also supports a control ring which causes a bolt cam to rotate, wherein the bolt cam is rotationally coupled with a shaft which supports a first cleat and a second cleat, and wherein the first cleat and the second cleat are configured to penetrate by rotation into grooves made in a first and a second integral retaining ring mounted on the tongue of the extraction piston.

11. The extraction gun according to claim 9, wherein the extraction gun includes two control handles allowing rotation of a ring driving the bolt cam, wherein each control handle includes an index rod terminated by an index which penetrates into an index hole in the extraction piston, and wherein a spring which rests on a shoulder of the index rod exerts a force on the index rod when the index rod is in a position of penetration in the index hole.

12. The extraction gun according to claim 9, wherein a foolproofing system is attached to the locking control sheath, wherein the foolproofing system includes a catch configured to engage in a lengthways slot formed in the extraction piston, and wherein the lengthways slot is terminated at each end by a groove, the groove being perpendicular to the lengthways slot.

13. The device according to claim 1, wherein the chamber ring and the integral retaining ring are of oval section, and wherein the device includes an additional module, wherein the additional module includes in a vertical plane of the device a first assembly of two retractable pins and, in two symmetrical positions relative to the vertical plane, two second assemblies of retractable pins, wherein the first assembly and the two second assemblies are configured to temporarily secure the integral retaining ring.

14. An oval-shaped or circular-shaped device for sealed attachment of an interchangeable member in a chamber ring, the chamber ring being mounted on a wall of a containment cell, wherein the device includes an integral retaining ring forming a double-seal in relation to the chamber ring, the integral retaining ring supporting the interchangeable member, wherein the integral retaining ring includes at least three recesses, wherein the chamber ring includes at least three bolts configured to penetrate into the at least three recesses to lock and prevent rotation of the integral retaining ring on the chamber ring, and wherein the chamber ring includes at least three sockets configured to receive locking tenons of an ejection gun, wherein the integral retaining ring includes a cavity configured to receive a key, the interchangeable member being mounted on the key, wherein the interchangeable member includes rolls or is full-skinned, wherein the integral retaining ring includes two lips which form the double-seal in relation to the chamber ring and wherein the integral retaining ring includes a protrusion positioned between the two lips, wherein the protrusion penetrates into a corresponding groove of the chamber ring and axially positions the integral retaining ring relative to the chamber ring, wherein the cavity includes a first cylindrical portion including a portion with first catches, and wherein the cavity includes a first conical portion opposite the first cylindrical portion, wherein the key includes a second cylindrical portion configured to contact the first cylindrical portion of the retaining ring and a second conical portion on which the first conical portion of the retaining ring is configured to exert pressure, wherein second catches on the second cylindrical portion of the key are configured to attach to the first catches of the integral retaining ring.

15. The device according to claim 14, wherein the second conical portion of the key includes either a sealing lip which is pressed on the first conical portion of the cavity or a lip which is pressed on the first cylindrical portion of the cavity upstream from the first conical portion of the cavity of the integral retaining ring to produce a first seal between the key and the integral retaining ring, wherein the second cylindrical portion of the key includes a sealing lip which is pressed on the first cylindrical portion of the cavity of the integral retaining ring to produce a second seal between the key and the integral retaining ring.

16. An oval-shaped or circular-shaped device for sealed attachment of an interchangeable member in a chamber ring, the chamber ring being mounted on a wall of a containment cell, wherein the device includes an integral retaining ring forming a double-seal in relation to the chamber ring, the integral retaining ring supporting the interchangeable member, wherein the integral retaining ring includes at least three recesses, wherein the chamber ring includes at least three bolts configured to penetrate into the at least three recesses to lock and prevent rotation of the integral retaining ring on the chamber ring, and wherein the chamber ring includes at least three sockets configured to receive locking tenons of an ejection gun, wherein the integral retaining ring includes a protrusion located at one end of the integral retaining ring, wherein the protrusion is followed by two sealing lips which form the double seal between the integral retaining ring and the chamber ring.

* * * * *